Dec. 28, 1965   H. E. RAILSBACK ETAL   3,226,018
RAPID PREFERENCE SYSTEM
Filed Nov. 29, 1961   22 Sheets-Sheet 1

INVENTORS
HAROLD W. STEWART
HORACE E. RAILSBACK

INVENTORS
HAROLD W. STEWART
HORACE E. RAILSBACK

INVENTORS
HAROLD W. STEWART
HORACE E. RAILSBACK

Dec. 28, 1965     H. E. RAILSBACK ETAL     3,226,018
RAPID PREFERENCE SYSTEM
Filed Nov. 29, 1961                      22 Sheets-Sheet 6
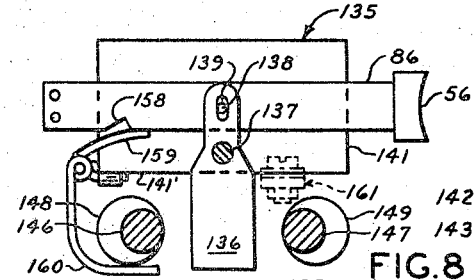
FIG.8
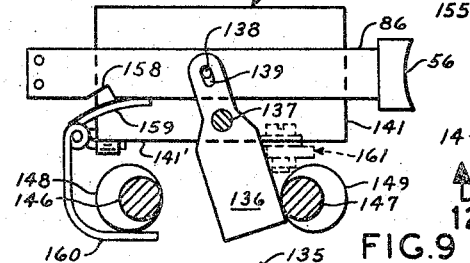
FIG.9
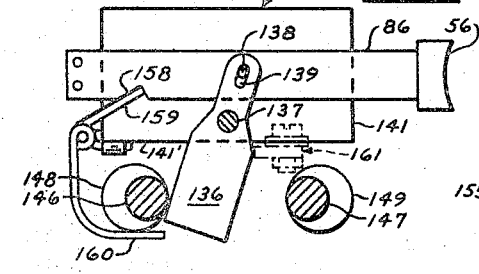
FIG.10
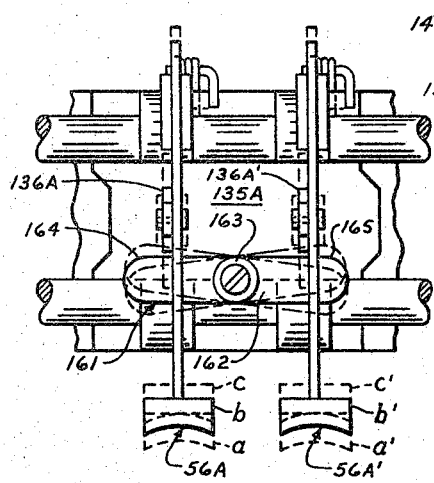
FIG.13
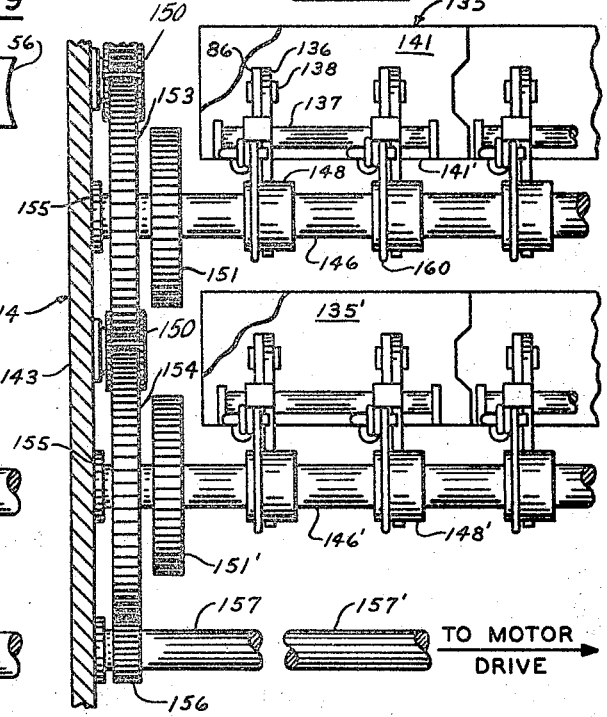
FIG.11
FIG.12
INVENTORS
HAROLD W. STEWART
HORACE E. RAILSBACK

INVENTORS
HAROLD W. STEWART
HORACE E. RAILSBACK

INVENTORS
HAROLD W. STEWART
HORACE E. RAILSBACK

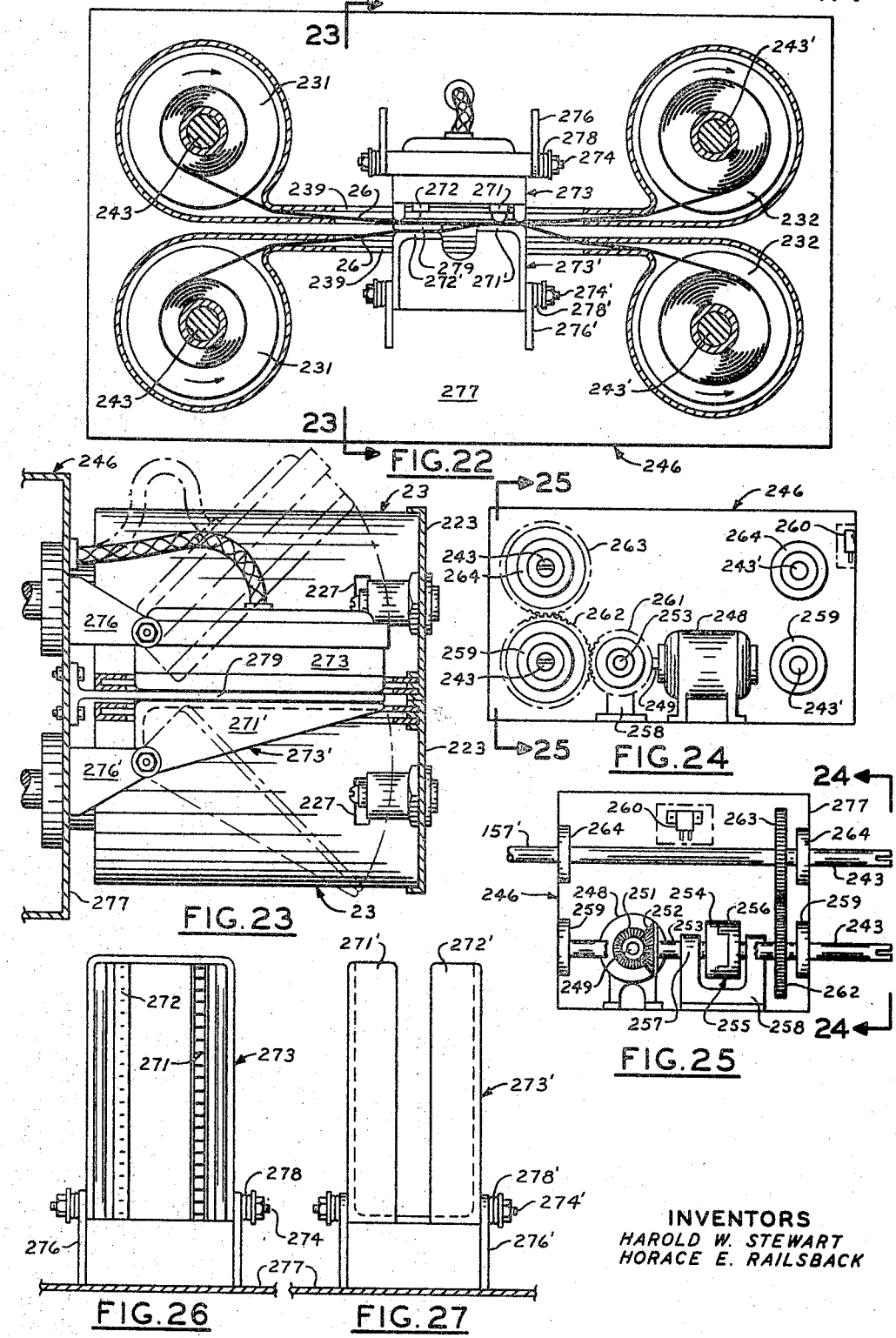

INVENTORS
HAROLD W. STEWART
HORACE E. RAILSBACK

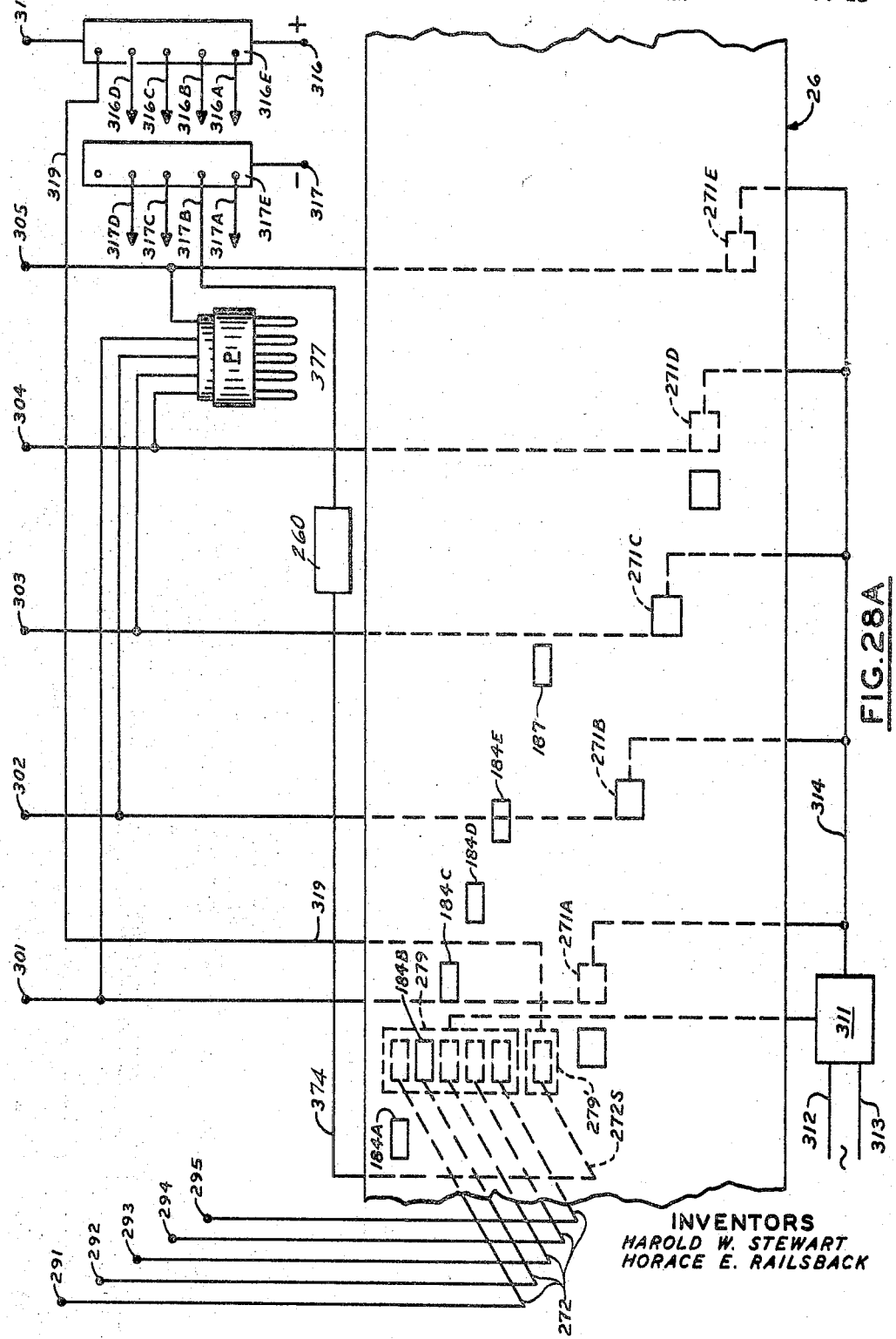

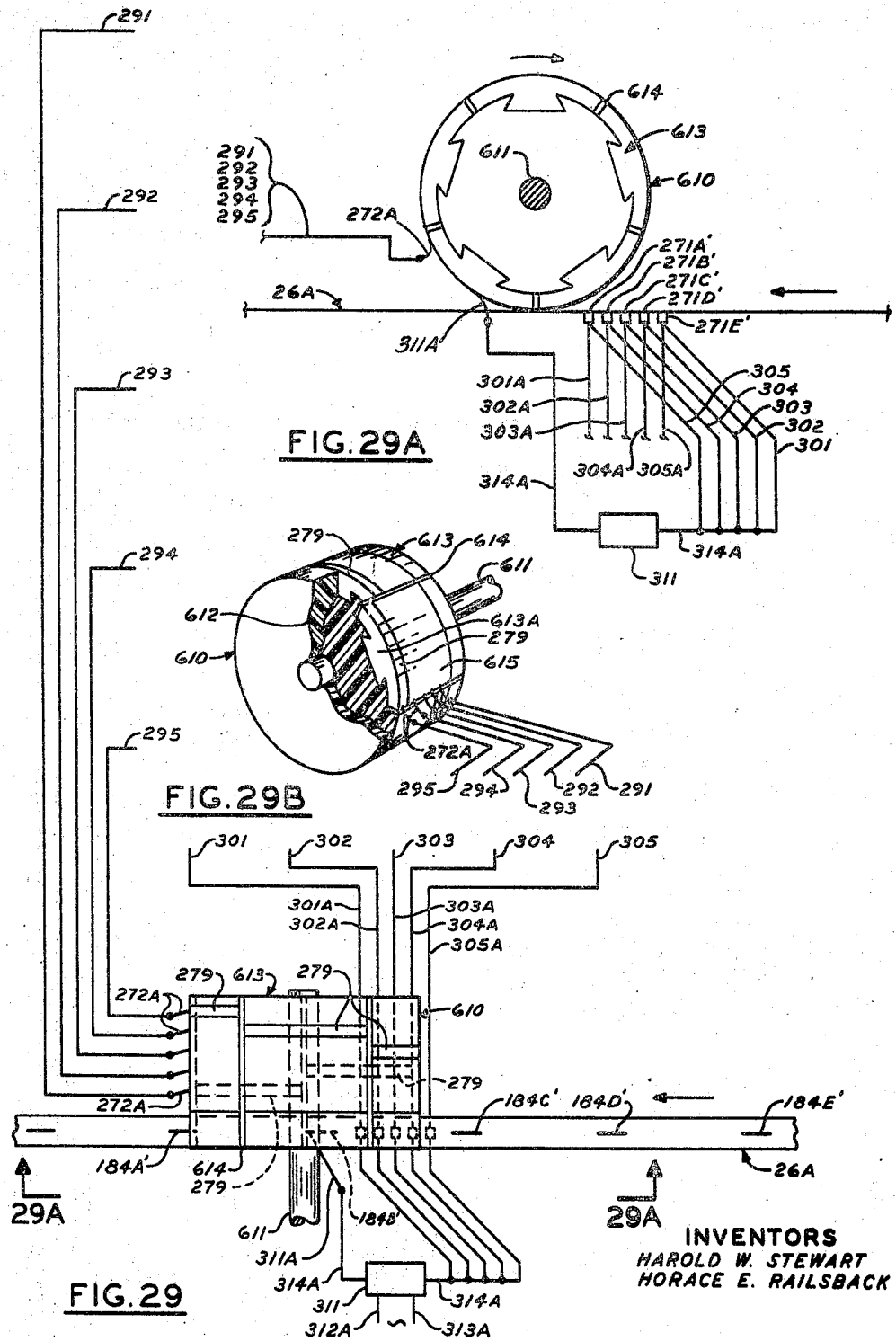

INVENTORS
HAROLD W. STEWART
HORACE E. RAILSBACK

Dec. 28, 1965  H. E. RAILSBACK ETAL  3,226,018
RAPID PREFERENCE SYSTEM
Filed Nov. 29, 1961  22 Sheets-Sheet 16

INVENTORS
HAROLD W. STEWART
HORACE E. RAILSBACK

INVENTORS
HAROLD W. STEWART
HORACE E. RAILSBACK

INVENTORS
HAROLD W. STEWART
HORACE E. RAILSBACK

INVENTORS
HAROLD W. STEWART
HORACE E. RAILSBACK

United States Patent Office 3,226,018
Patented Dec. 28, 1965

3,226,018
RAPID PREFERENCE SYSTEM
Horace E. Railsback and Harold W. Stewart, both of P.O. Box 1737, San Francisco 1, Calif.
Filed Nov. 29, 1961, Ser. No. 155,544
5 Claims. (Cl. 235—50)

The invention, in general, relates to equipment and methods of recording, collecting and compiling, as well as reporting and cumulatively exhibiting multiplicities of optionally selected data or indicia. More particularly, the invention pertains to an improved tamper-proof and accurate rapid preference system embodied in vote-casing and vote-tabulating apparatus and methods as well as in related equipment and systems.

While heretofore there have been devised a number and variety of mechanically operable vote-casting machines from which totals are visually-manually transferred and subsequently fed or introduced into mechanical or electrically operable counters, approximately two-thirds of the voters in this country are required to designate their selections upon printed paper ballots, using a rubber stamp and stamp pad, or the like, to mark the ballots from which the totals, again, are visually-manually transferred to recapitulation sheets and the sub-totals fed or introduced into tabulating mechanisms. The amount of time consumed in counting the votes cast in any given election by such means and methods is appreciably great, and the likelihood of errors in the visual-manual transfers is extremely high with the consequent necessity of a re-counting of the election returns in order ultimately to obtain an official count, all to the increased expense of the election. While the introduction or advent of mechanical vote-casting devices has reduced to some extent the time consumed in attaining an official count, these mechanical means have not materially reduced the errors that occur in the counting of the votes, nor have the use of these machines appreciably lowered the expense of elections. The present invention is directed to the provision of electro-mechanical equipment for efficaciously and rapidly completing the casting and counting of preferences, such as in primary, general and special elections of candidates for public or other offices or for adopting or refusing to adopt measures for the public welfare or other propositions; such improved rapid preference system obviating all of the disadvantages inherent in prior equipment and systems of this nature.

A primary object of our invention is to provide a rapid preference system which affords complete and total secrecy of preference made or selected and which also possesses the attribute of eliminating the necessity of visual-manual transfer of preferences from one medium to other media in order to attain an accurate totalization of preferences.

Another primary object of our invention is to provide a rapid preference system which is characterized by the total isolation of the official ballot data from all manual accounting procedures; all ballot data being protected from any human review or intervention from the instant the voter makes his choice to the point where the final summarized results are presented by read-out or print-out at a central tabulating center.

Another important object of the present invention is to provide an improved rapid preference system of the indicated nature which is additionally characterized by the simplicity of use of the equipment embodied in the system; such system being readily employed by the unskilled with equal facility as by skilled persons.

A still further object of our present invention is to provide a rapid preference system of the aforementioned character which reduces the likelihood of fraudulent voting or tampering with ballots, or with the counting thereof, to an absolute minimum.

Another object of the invention is to provide an improved rapid preference system which requires but a minimum of maintenance and which is appreciably less expensive to operate, as well as having a much lower cost of transportation with respect to the various polling place units.

Other objects of the invention, together with some of the advantageous features thereof, will appear from the following description of a preferred embodiment as well as certain modified embodiments of our invention including components, which are illustrated in the accompanying drawings. It is to be understood, however, that we are not to be limited to the precise embodiment shown, nor to the precise components thereof which have been illustrated, nor to the precise arrangement of such various components, as our invention, as defined in the appended claims, can be embodied in a plurality and variety of forms and carried out in a plurality and variety of ways.

While our invention is entirely suitable for adaptation to and in variety of different environments, such as in the recording, compiling, reporting and exhibiting of statistical information in connection with a wide variety of industrial and commercial enterprises, or for attaining the same objects as well as others with respect to public opinion polls or in connection with inventories or many types of data handling, we have illustrated and shall hereinafter describe our invention, solely for brevity and purposes of explanation, in the environment of vote-casting and vote-tabulating or counting in any election whether it be national, state, county or local elections within political bodies or in relation to social or labor organizations and the like.

Referring to the drawings:

FIG. 8 is a sectional elevational view of one push-button switch element constituting a part of a switch body member, and actuable cams associated with the circuit shown in FIG. 7; this view being taken on the line 8—8 of FIG. 11, and showing the switch element in neutral position.

FIG. 9 is a view similar to FIG. 8 but with the switch element depicted in a voting position.

FIG. 10 is another view similar to FIG. 8, but with the switch element in a fully out or write-in vote position.

FIG. 11 is a plan view, partly in section, of the push-button switch element bodies, and of the actuable cams associated therewith and with the circuit shown in FIG. 7.

FIG. 12 is a sectional elevational view of the components shown in FIG. 11, taken on the line 12—12 thereof, and constituting parts of a preferred embodiment of our invention.

FIG. 13 is a framentary plan view of a modified switch and cam body employable with the circuit shown in FIG. 7, this view including a rocker arm or toggle attachment for removable mounting upon the polling place equipment in lieu of the switch body shown in FIGS. 11 and 12.

FIG. 22 is an enlarged longitudinal sectional view through the cassette, illustrating the tape and tape transportas well as recording head and contact brush.

FIG. 23 is a view of the components shown in FIG. 22 and taken on the line 23—23 thereof, the pivotal mounting of the recording head and backing plate therefor being illustrated by dot and dash lines.

FIG. 24 is a reduced elevational view of the interior of the cassette housing, this view being taken on the line 24—24 of FIG. 25.

FIG. 25 is another elevational view of the interior of the cassette housing, this view being taken on the line 25—25 of FIG. 24.

FIG. 26 is an elevational view of a spring-loaded casing for housing the preferred contact brushes and recording head components of the preferred embodiment of the invention.

FIG. 27 is an elevational view similar to FIG. 26 but showing the spring-loading backing plate for the components shown in FIG. 26.

Figure 28:
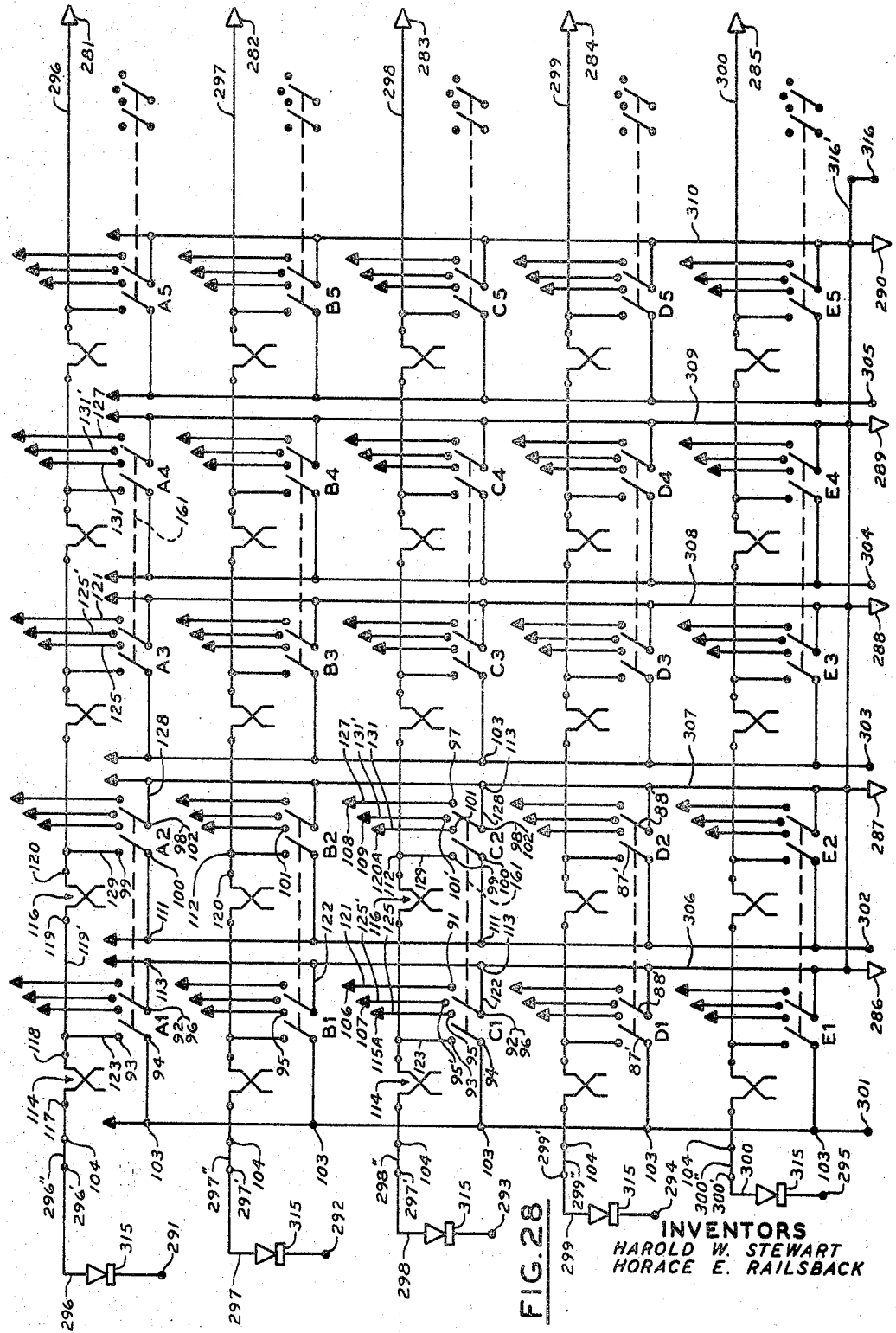

FIG. 28 and FIG. 28A, taken together, constitute a schematic elevational plan view of the primary electrical circuit employed in the polling place component of the preferred embodiment of our invention, these views showing diagrammatically a fragmentary plan view of the preferred master recording tape in relation to the recording heads during transport of the tape.

Figure 14:
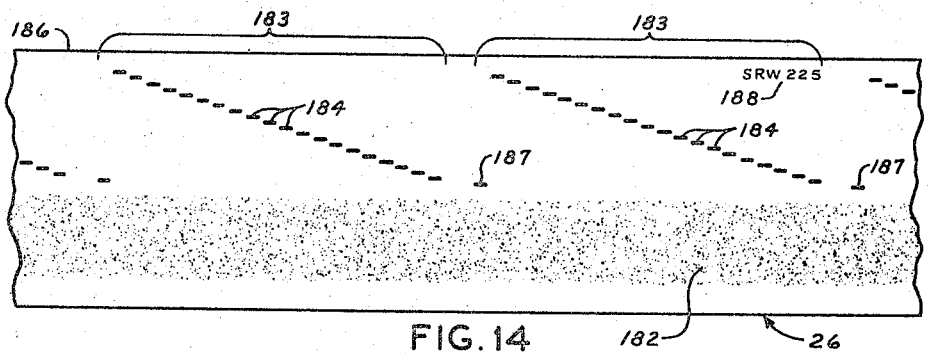
FIG. 14 is a fragmentary plan view of a preferred embodiment of a master recording tape employed in our rapid preference system.
Figure 14A:
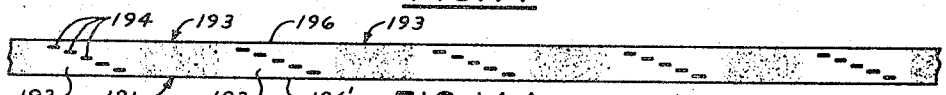
FIG. 14A is a fragmentary plan view of a modified recording tape or film employable in an exemplification of a preferred embodiment of our invention.
Figure 14B:
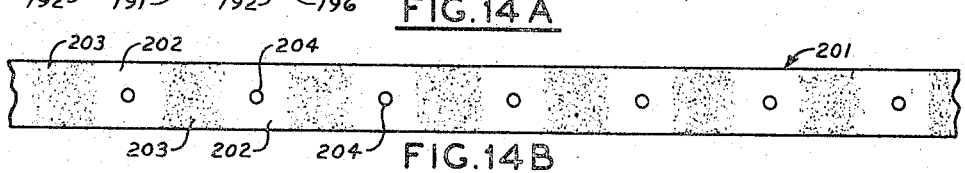
FIG. 14B is a fragmentary plan view of another modification of a tape or film that could be employed in an exemplification of our rapid preference system.
Figure 14C:
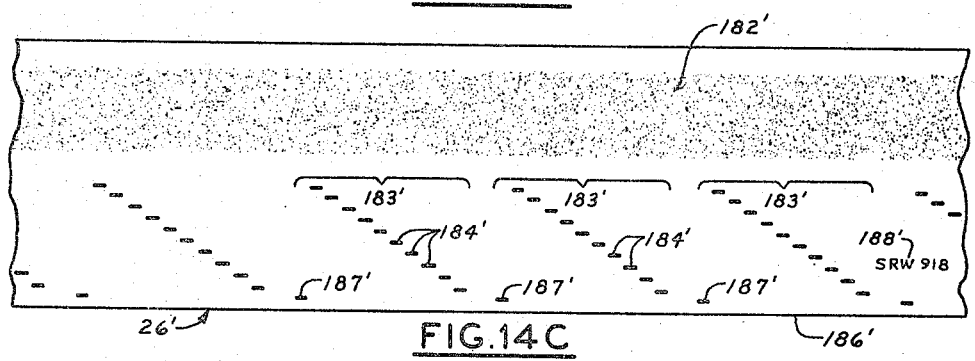
FIG. 14C is a fragmentary plan view of still another modified form of tape or film employable in an exemplification of the invention.
Figure 14D:
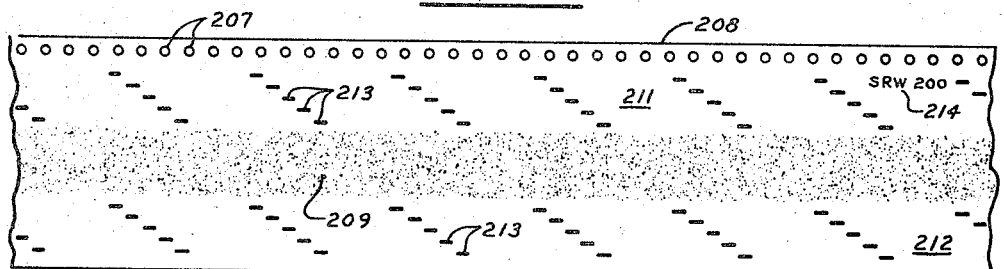
FIG. 14D is a fragmentary plan view of a further modification of tape or film component that is utilizable in an exemplification of our rapid preference system.
Figure 14E:
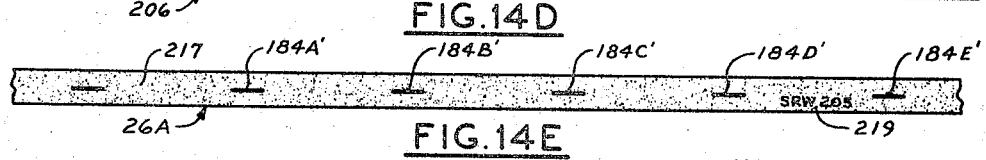
FIG. 14E is a fragmentary plan view of a still further modification of a recording tape which may be employed with a modified embodiment of the invention.
Figure 15:
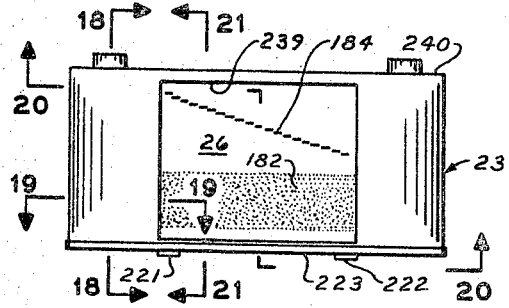
FIG. 15 is a plan view of a preferred cassette component, or tape carrying means, used in the preferred embodiment of our invention; this view showing a portion of the preferred embodiment of the recording tape component of the system.
Figure 16:
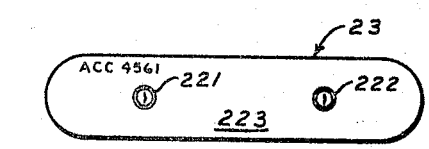
FIG. 16 is a front elevational view of the cassette shown in FIG. 15, this view showing showing the faces of the two locks therein.

FIG. 29 is a fragmentary schematic plan view of a rotatable scanning device which can be employed with the modified embodiment of recording tape shown in FIG. 14E and in conjunction with the electrical circuit illustrated in FIG. 28.

FIG. 29A is a sectional elevational view of the modification of FIG. 29, including modified recording head, this view being taken on the line 29A—29A of FIG. 29.

FIG. 29B is an enlarged perspective view of the embodiment of the rotatable scanning device shown in FIG. 29A for use with the electrical circuit shown in FIG. 28.

Figure 30:
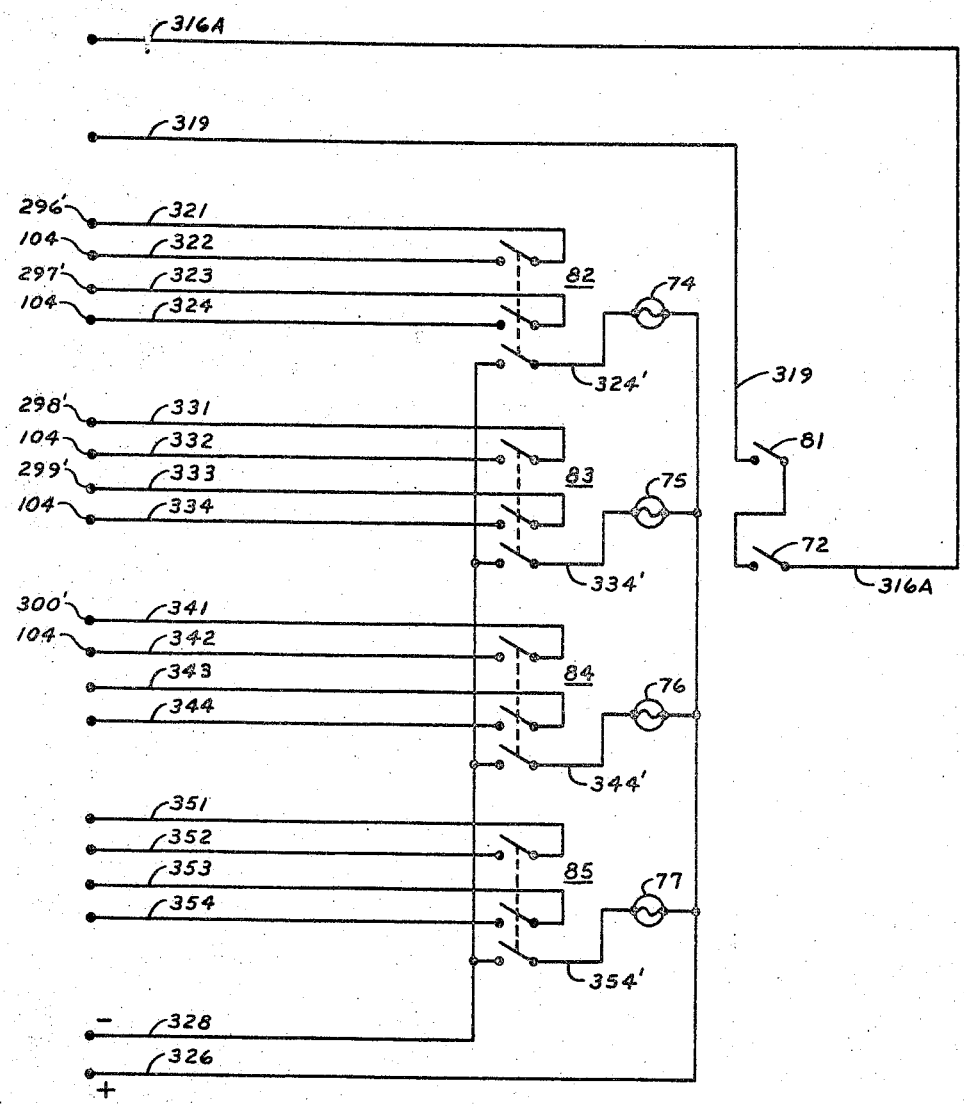

FIG. 30 is a schematic plan view of an auxiliary polling place circuit for connection into the primary circuit of such component of our preferred rapid preference system.

Figure 31:
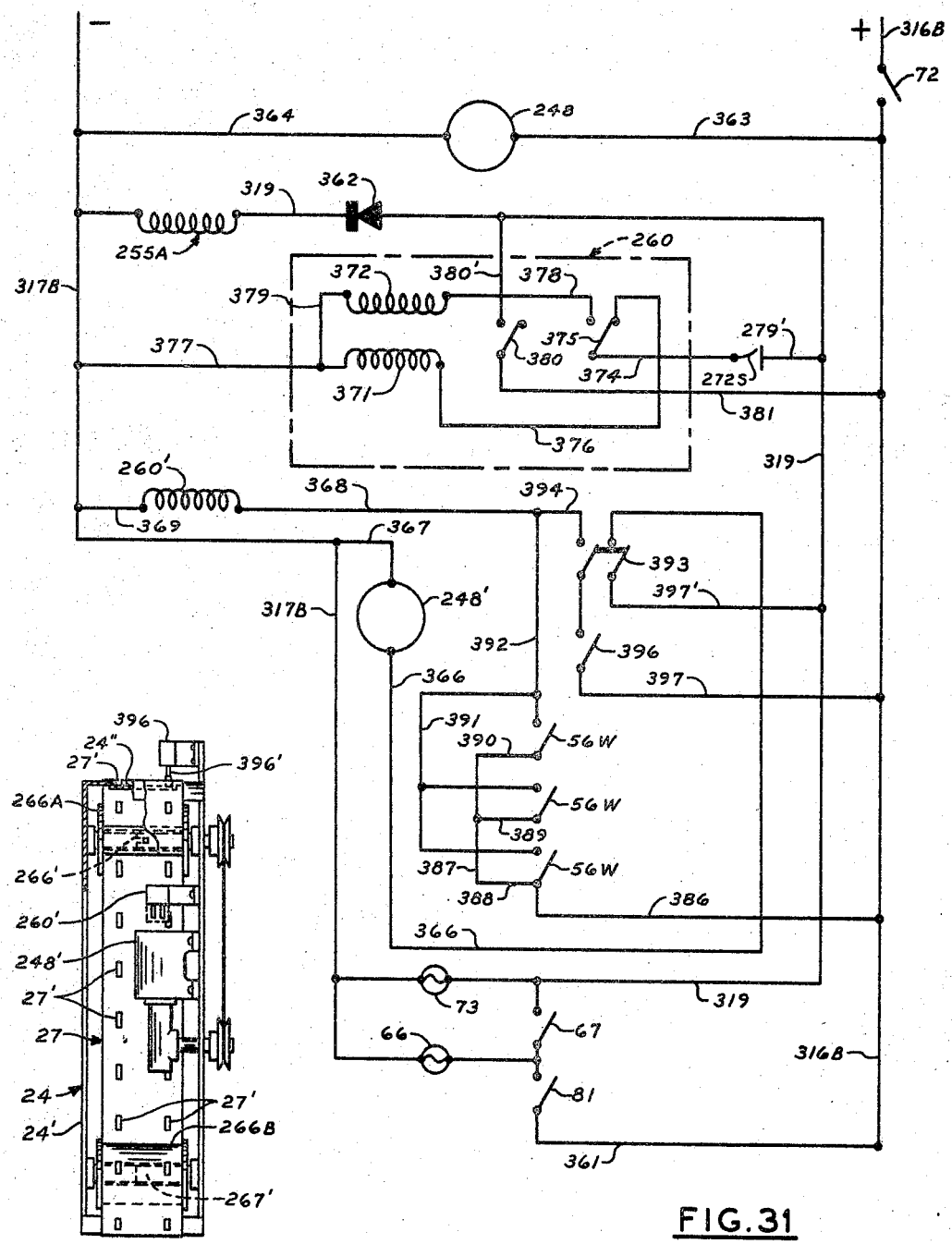

FIG. 31 is a schematic plan view of a secondary electrical circuit for use in conjuncion with the primary circuit of the preferred polling place component of the present invention, such secondary electrical circuit being contained in each polling place apparatus and showing transport means for the recording tape as well as for the paper tape.

FIG. 31A is a rear elevational view of the paper transport means of the preferred embodiment of our invention.

Figure 32:
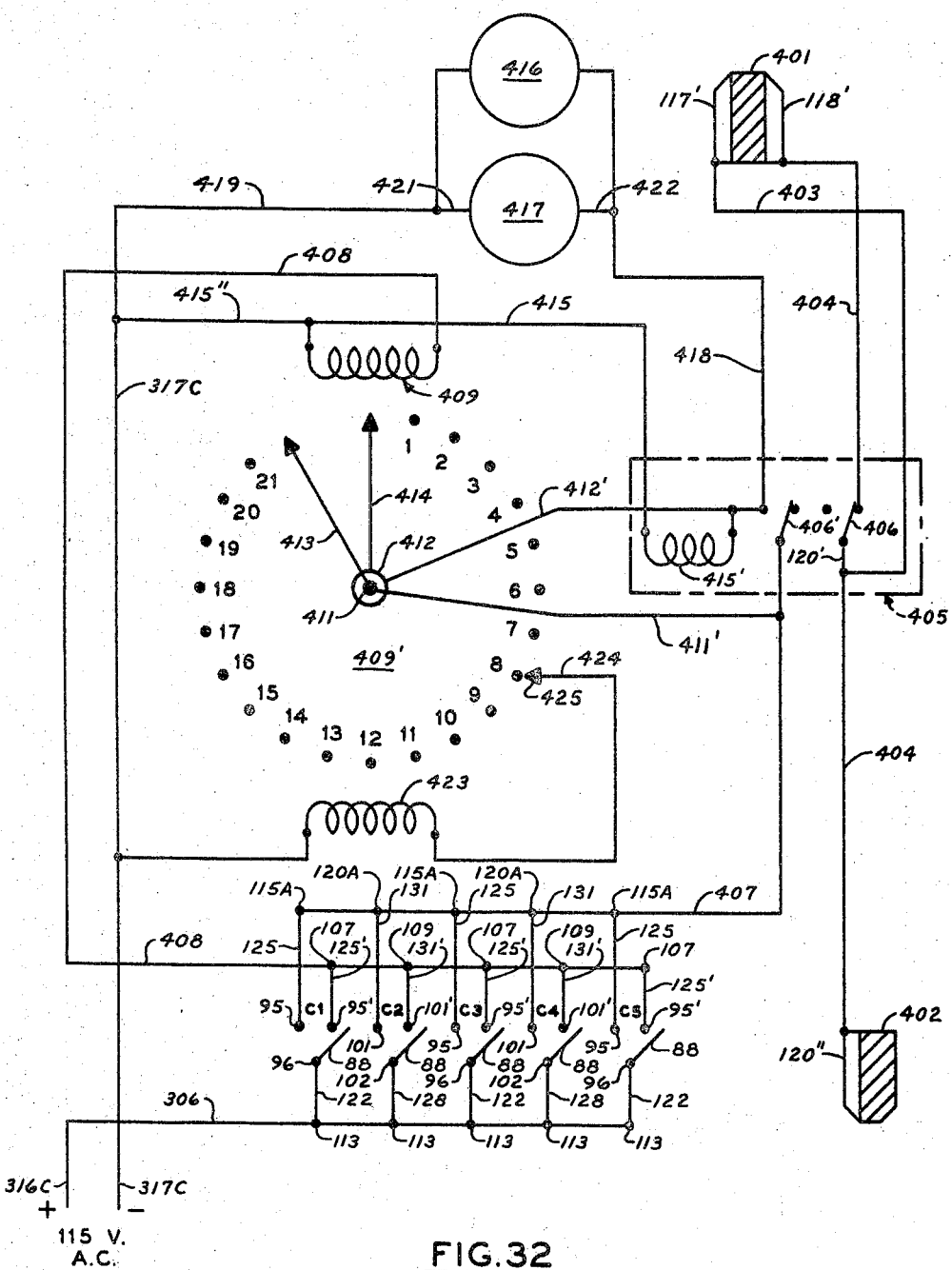

FIG. 32 is a schematic plan view of another auxiliary circuit for connection to the primary electrical circuit of the polling place console of a preferred embodiment of the invention.

Figure 33:
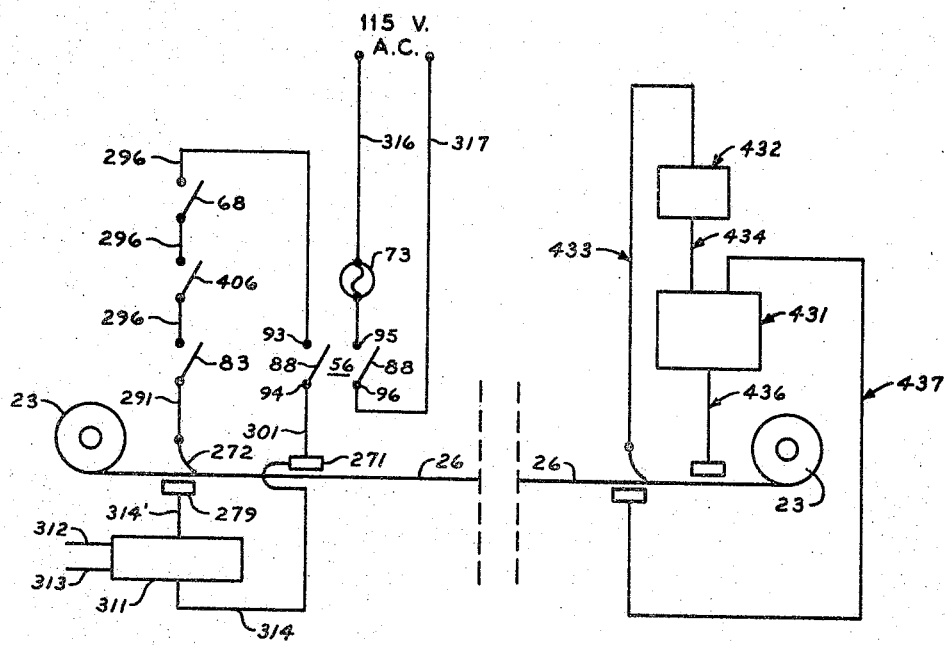

FIG. 33 is a schematic flow diagram indicating the movement of a single vote through the entire rapid preference system of our present invention; this view graphically depicting the recordation of a preference on the master recording tape and the counting of a preference by playback of the tape in the tabulator.

Figures 33A, 33B:
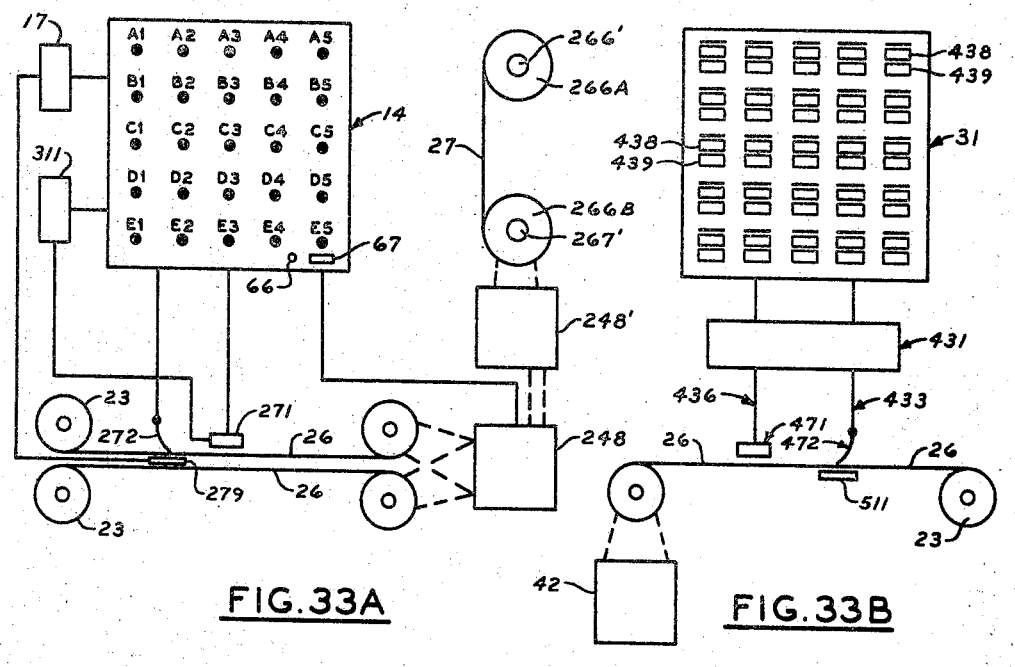

FIG. 33A is a schematic elevational view of the front panel of the polling place component with tape transport therethrough as well as paper transport of write-in preferences therethrough.

FIG. 33B is a schematic elevational view of the front panel of the tabulator of a preferred embodiment of the invention, this view illustrating the transport of the recordations-bearing tape therethrough and the play back of such tape.

Figure 34:
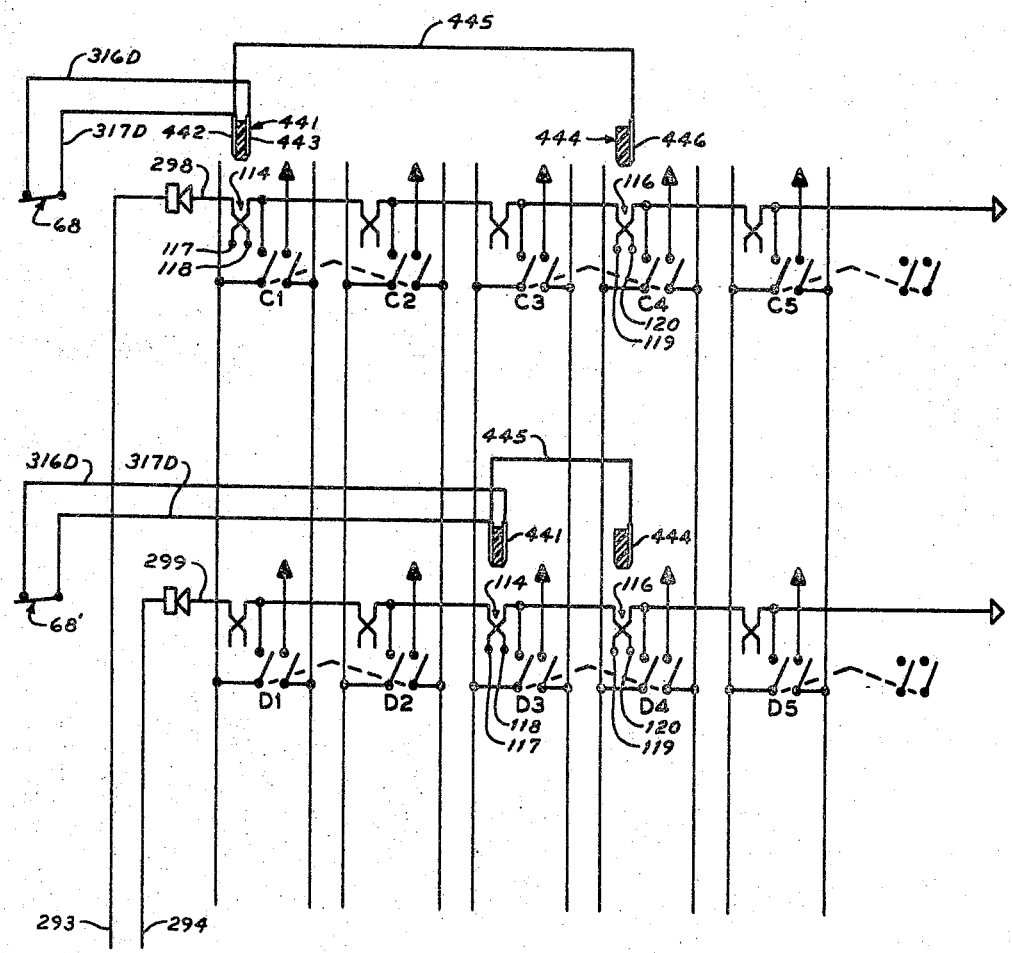

FIG. 34 is a schematic plan view of another auxiliary circuit that may be connected into the primary electrical circuit of the polling place component of our rapid preference system.

Figure 35A:
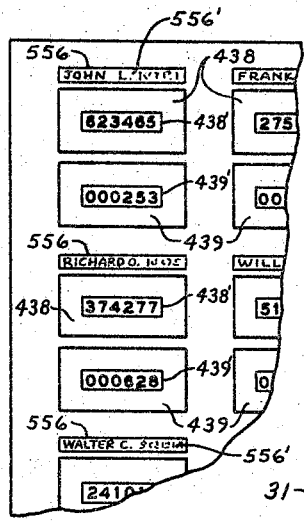
Figure 35:
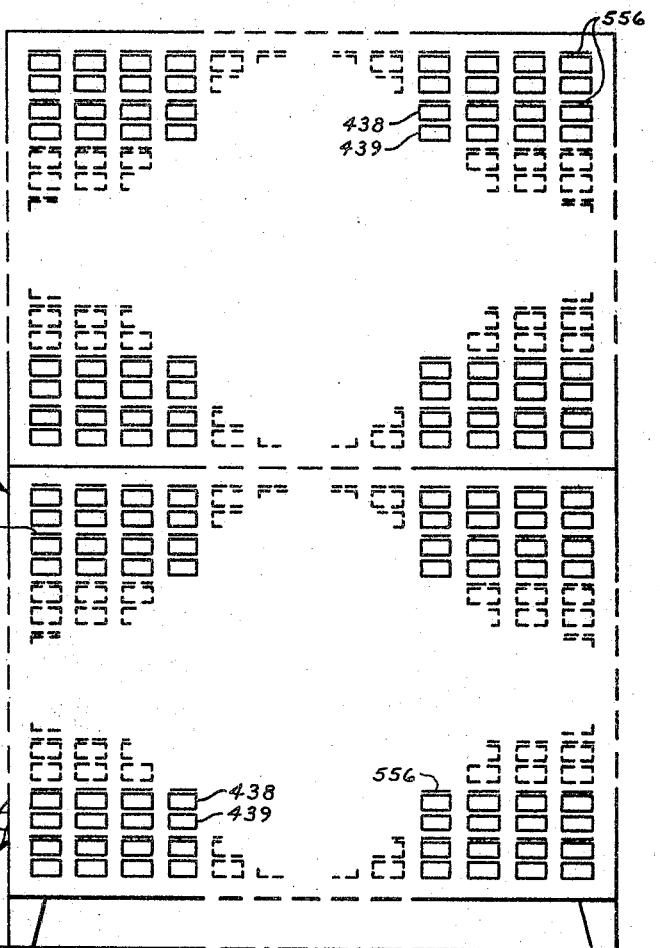

FIG. 35 is an incomplete front elevational view of the visual panel of a preferred tabulating component or counter employed in our rapid preference system.

FIG. 35A is an enlarged fragmentary elevational view of the front panel of the tabulator shown in FIG. 35 with numerals entered in the register or counter openings indicating cumulative totals of counted precincts as well as sub-totals of preferences at any given precinct.

Figure 36:
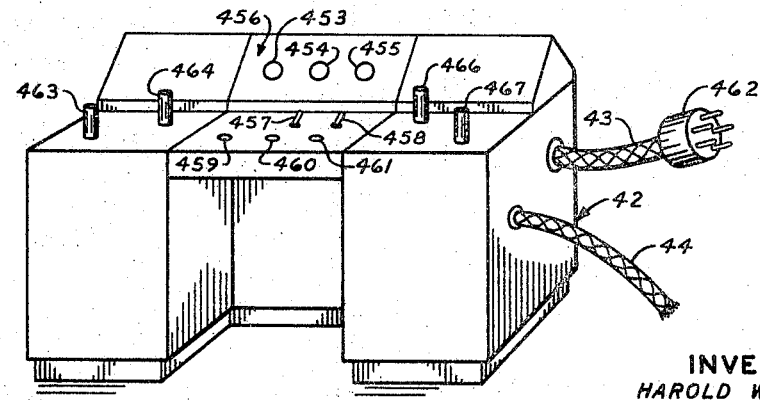

FIG. 36 is a perspective view of an official's control console for use in conjunction with the counter shown in FIGS. 35 and 35A, or in conjunction with a printer or other mechanism, not shown.

Figure 37:
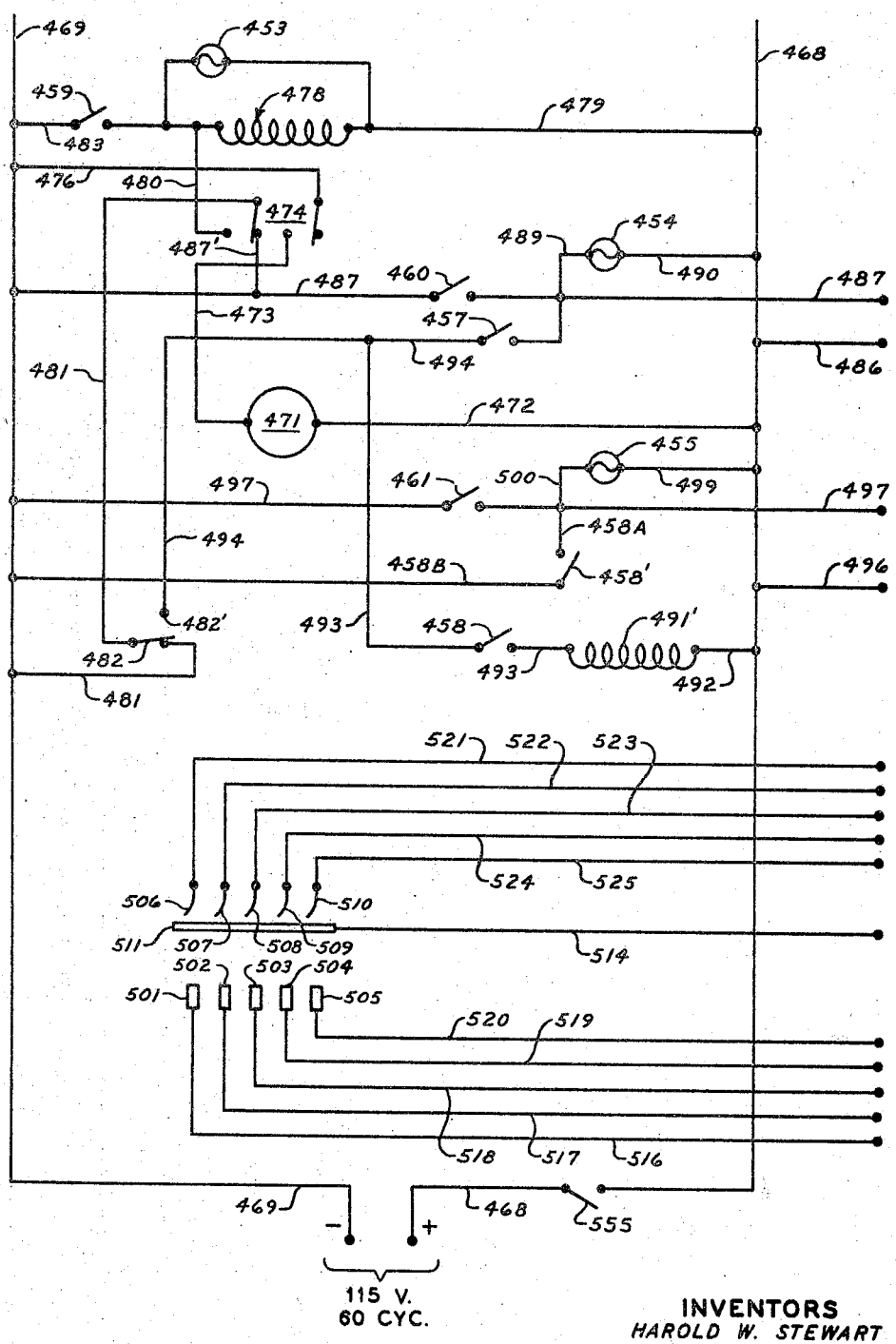

FIG. 37 is schematic plan view of an operator's console control circuit usable with the tabulator and connectable to the main electrical circuit thereof.

Figure 38:
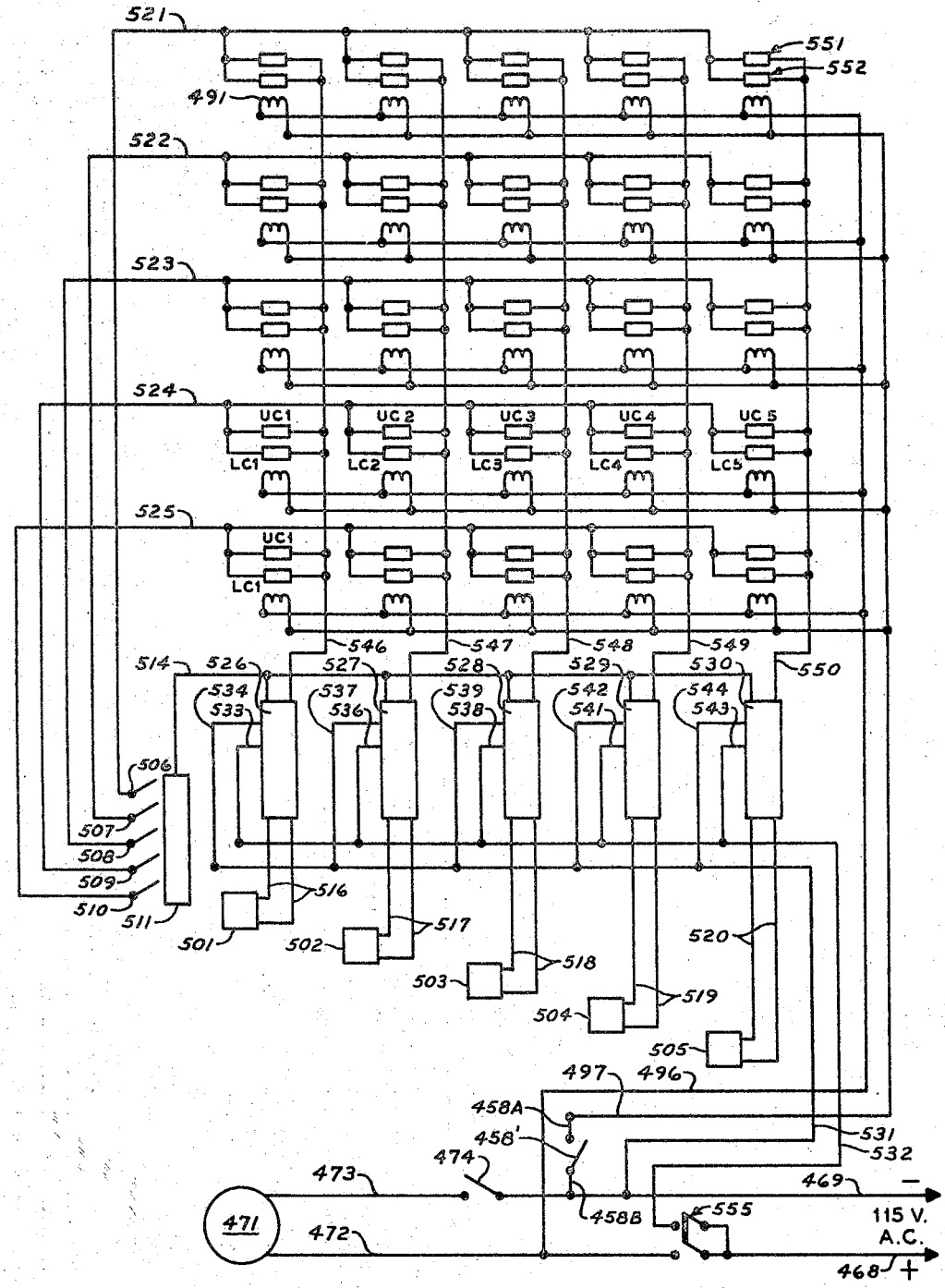

FIG. 38 is a schematic plan view of the main electrical circuit of the tabulating means of a preferred embodiment of our invention, including diagrammatic showing of elements of the circuit and the connections to the contact brushes and pick-up heads operative on the play-back of the recording of film.

Figure 39:
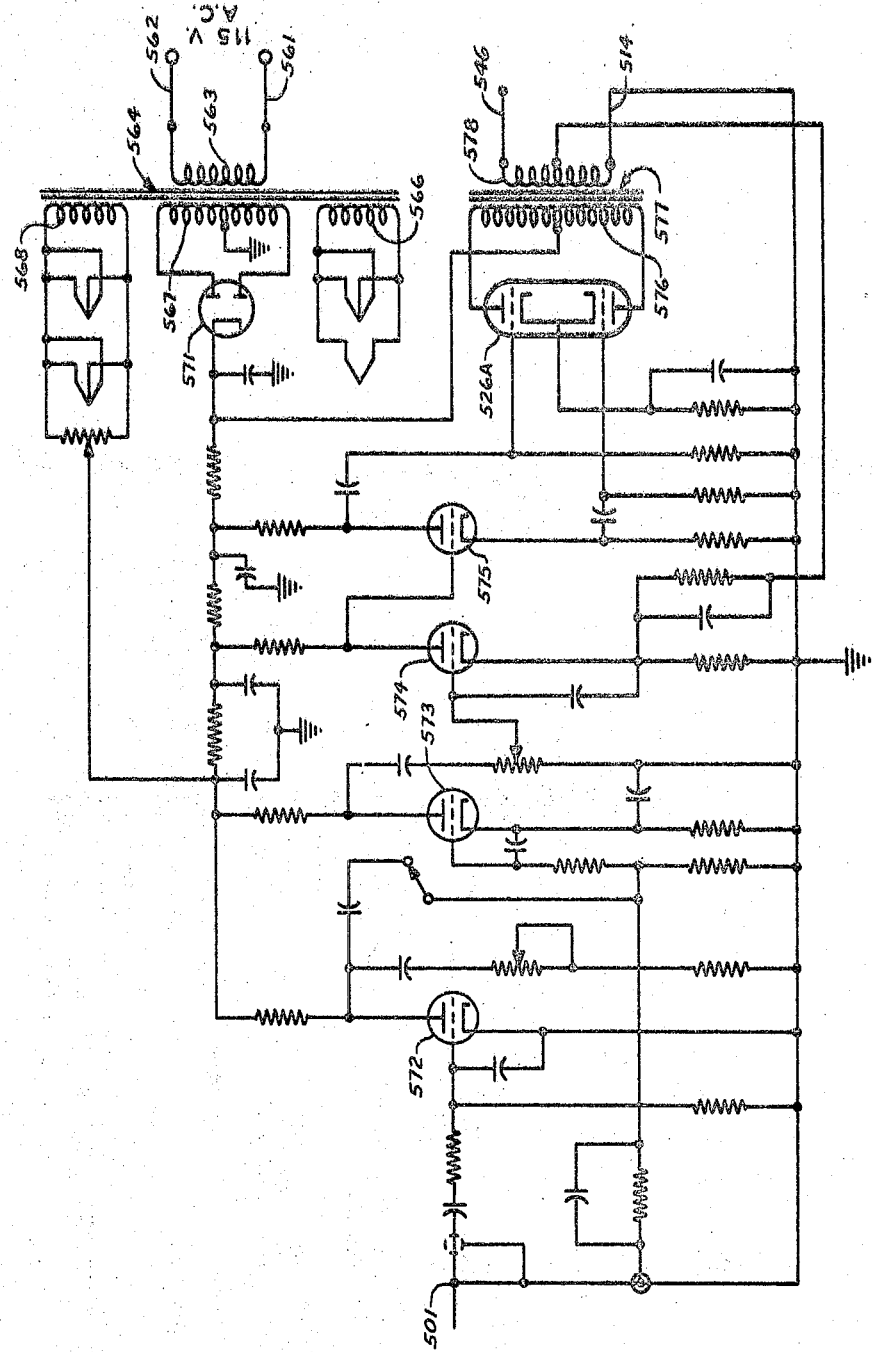

FIG. 39 is a schematic plan view of a typical vacuum tube-amplifier circuit that may be employed with the tabulator component of our rapid preference system.

Figure 40:
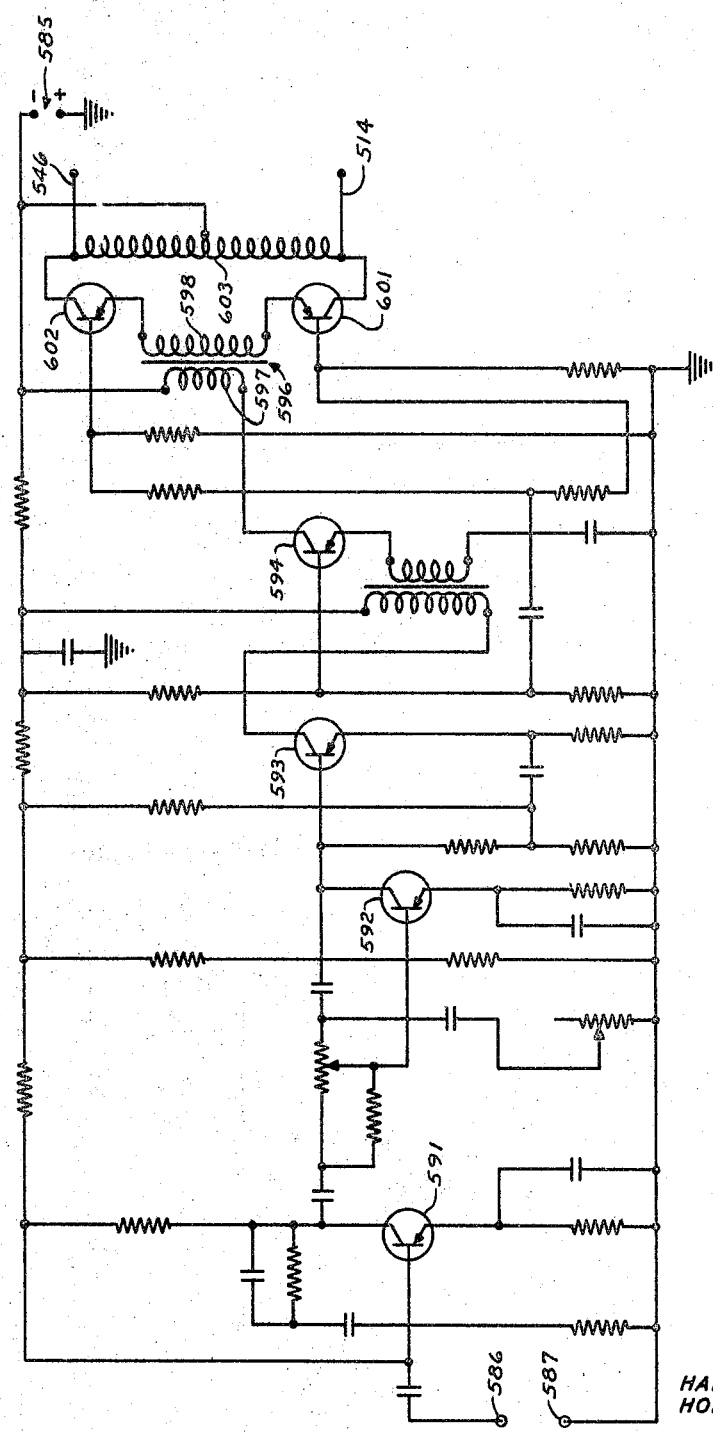

FIG. 40 is a schematic plan view of a typical transistorized amplifier circuit which may be employed with the tabulator component of our rapid preference system.

In its preferred form the rapid preference system of our present invention preferably comprises, in combination with recording tapes of indeterminate length and having a predetermined number of openings therein arranged in a predetermined pattern, a plurality of vote-casting devices, a vote tabulator, a primary electrical circuit in each of said vote-casting devices, a plurality of movable selective means on said vote-casting devices electrically connected into said primary circuit, means in each of said vote-casting devices for movably supporting at least one of said recording tapes; each of said tapes being transportable in a forward direction to present successive sections thereof for recording electro-magnetically applied binary digits, hereinafter also termed bits, together with a master switch controlling each of said primary circuits; closing of said circuits periodically upon completion of designation of preferences by movement of said selective means on said vote-casting devices automatically effecting simultaneous transport of said tape and the recordation of bits thereon corresponding to the designations of preference made by prior movement of said selective means, means for resetting said movable selective means, a tabulator electrical circuit, and means in said tabulator circuit actuated by the energization of said tabulator circuit for transporting said tape in a reverse direction, hereinafter sometimes termed play-back mechanism, and simultaneously recovering from said tape and exhibiting the same numerically on impulse counters all bits applied thereto which correspond to the designations of preferences made by movement of said selective means on said vote-casting devices.

A modified embodiment of our rapid preference system provides for electrically connecting one side of a conventional data transmitting device to said primary electrical circuit of said vote-casting device and the other side of said data transmitting device to telephone transmission lines for transmitting thereover the bits recorded on said tape, together with conventional data receiving equipment electrically connected on its one side to said telephone transmission lines for recovering the bits transmitted thereover, and either a counter having a plurality of individual impulse counters electrically connected to the other side of said data receiving equipment to read-out totals of votes cast or conventional data processing equipment connected to said other side of said data receiving equipment for print-out of totals of votes cast.

Figure 1:
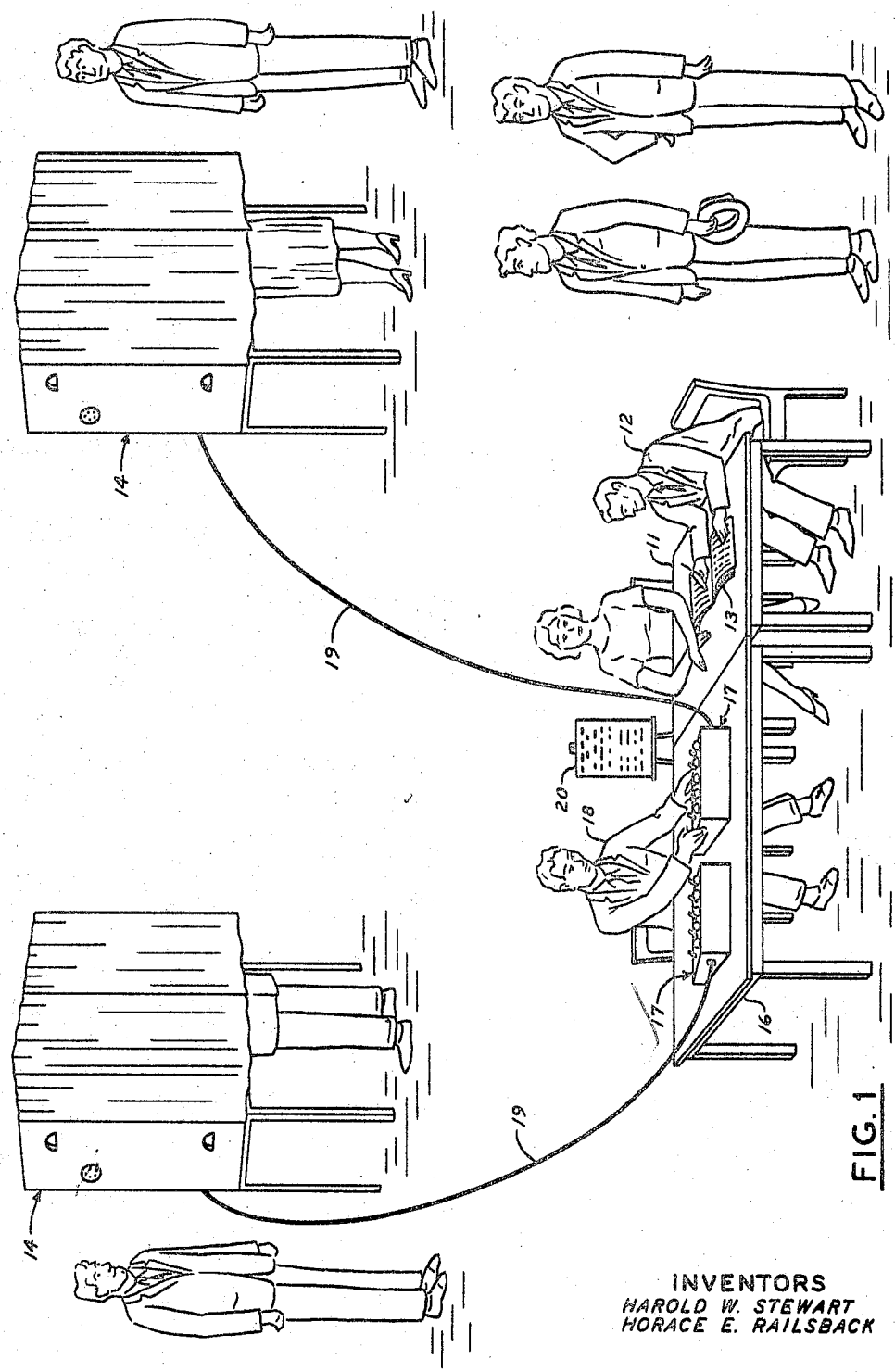
FIG. 1 is a schematic elevation of poling place components employed in a preferred embodiment of our invention, this view graphically depicting a scene at a voting precinct at any given moment during an election day.
Figure 2:
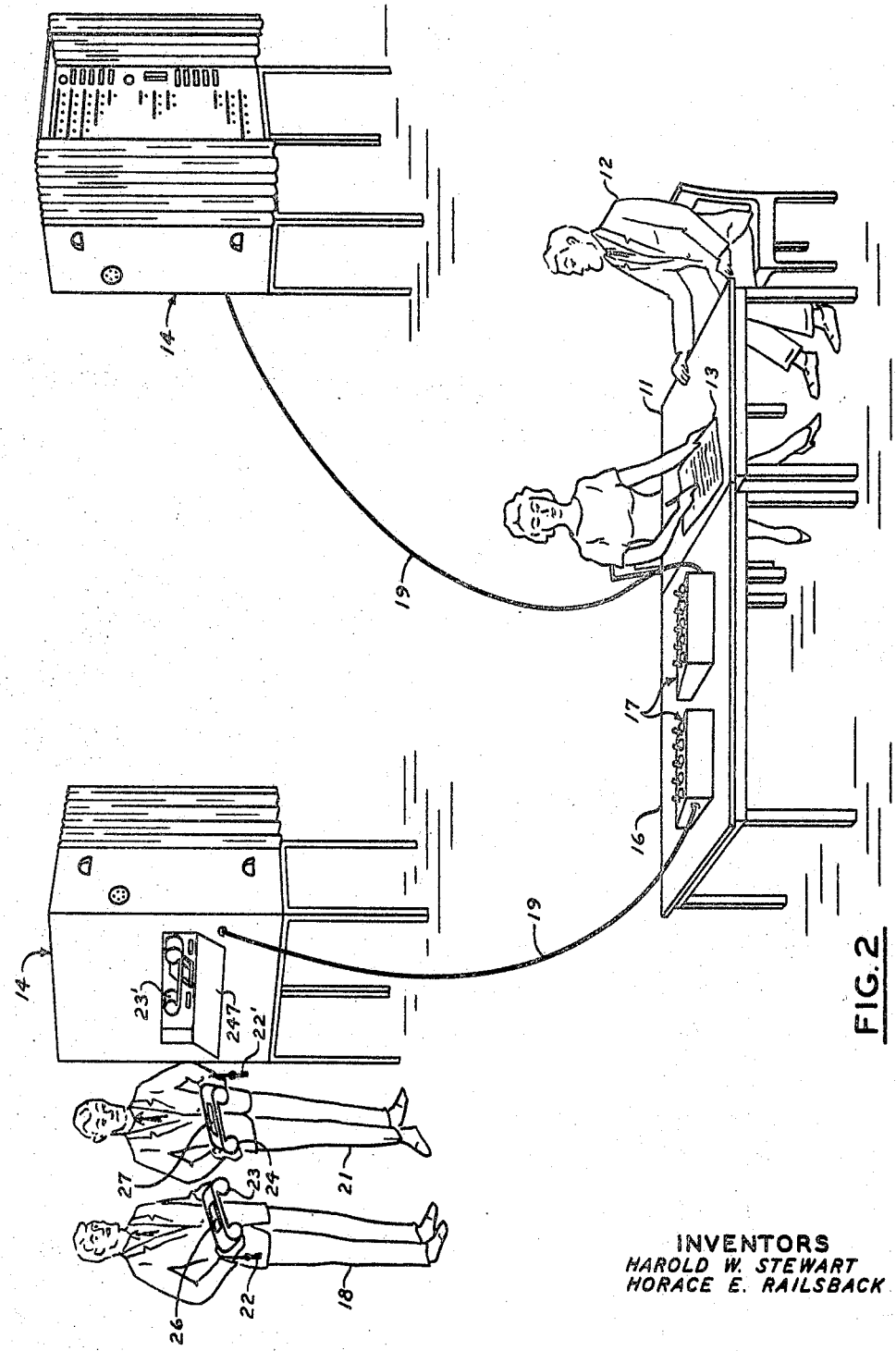
FIG. 2 is a schematic elevation of the same components shown in FIG. 1, together with certain elements removed therefrom; this view showing a typical voting precinct scene at the close of the polls.
Figure 3:
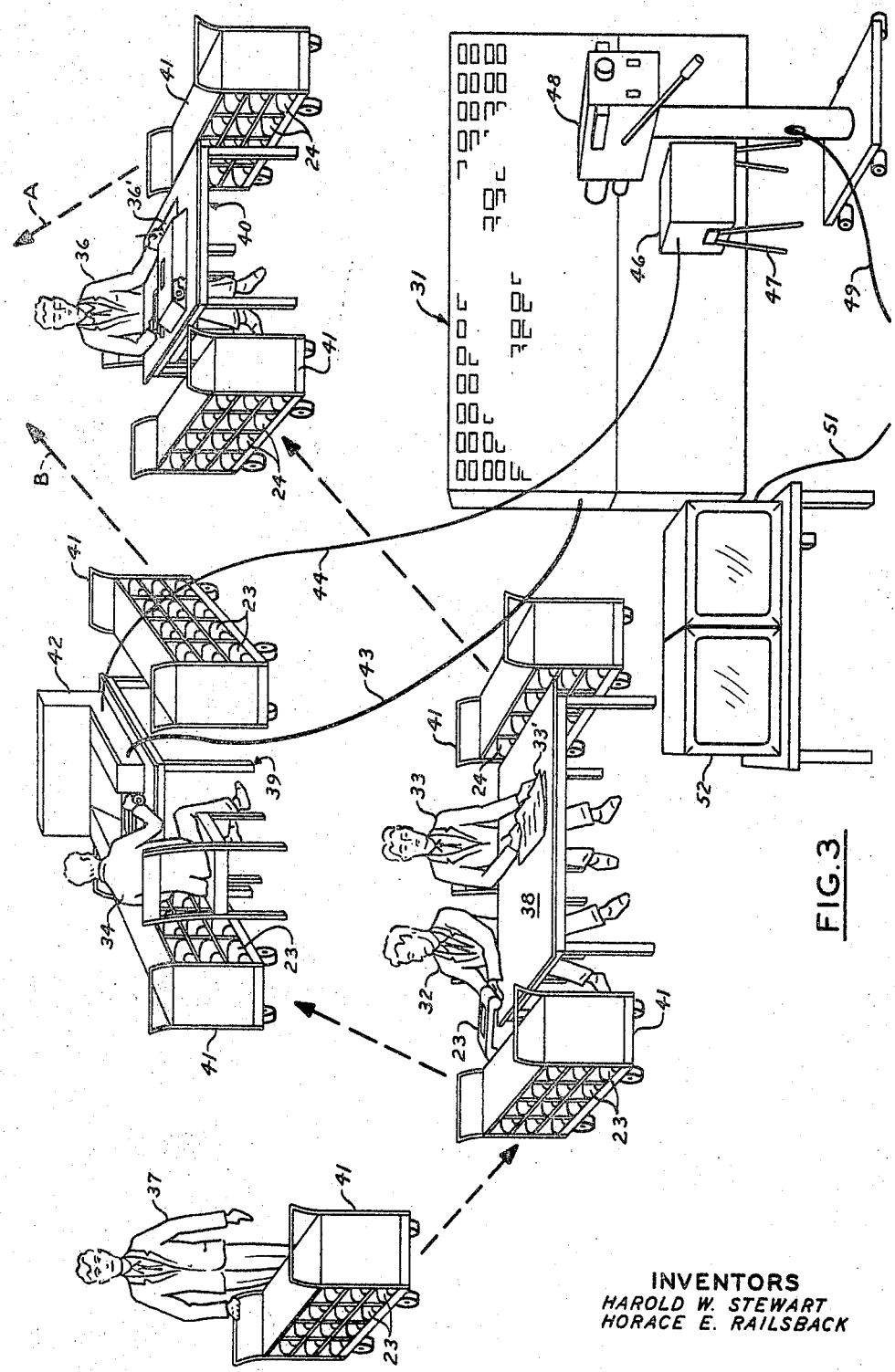
FIG. 3 is a schematic elevational view of certain components employed in a preferred embodiment of our invention; this view graphically depicting a scene after the close of polls and at an official counting or tabulating center.

We have graphically depicted in FIGS. 1-3 inclusive of the annexed drawings typical scenes at voting precincts and vote tabulating headquaters on any given election day and during which our improved rapid preference system has been employed for the casting as well as the counting of votes. FIG. 1 depicts the start of a day at any given election precinct, this view representing graphically a typical precinct worker's desk 11 at which a voter 12 may enter his name in a register 13 in the customary manner. The scene of FIG. 1 illustrates two of our preferred embodiment of vote-casting devices in use, each such device being generally designated by the reference numeral 14 and hereinafter referred to as polling place apparatus. In addition to the persons within the polling place apparatus in the process of selecting their preferences, as well as the persons waiting adjacent thereto, the view of FIG. 1, depicts an official's table 16 upon which are supported a plurality of control consoles which are designated generally by the reference numeral 17; it being understood that a single console 17 is requisite for each polling place apparatus required at any given voting precinct for operation either by one official 18 or by a number of officials depending upon the size of the voting precinct and the number of control consoles 17 needed to fulfill requirements. Cables 19 are provided for carrying electrical conductors and for establishing electrical communication between each control console 17 and each polling place apparatus 14. A display instruction card 20 can be suitably supoprted adjacent to the official's desk for guidance of voters.

A typical precinct closing time on an election day is depicted in FIG. 2 of the annexed drawings but with important exceptions which stress features of our present invention. In this view, one voter 12 remains for entering his name on the register 13 and for casting his vote in the polling place apparatus 14 shown at the upper right of this view and available for the last voter to make his preferences. However, the polling place apparatus 14 shown at the upper left of this view has been opened at the back by official 18 with the assistance of an authorized representative 21 from voting headquarters; it being noted that both the official 18 and the representative 21 have keys 22 and 22' without both of which the polling place apparatus cannot be opened. Each of the officials 18 and 21 is holding a cassette 23 and 24, respectively, which contain a master recording tape 26 and write-in paper tape 27, respectively. As hereinafter explained, the cassettes 23 and 24 which are thus removed from each polling place apparatus at the end of each election day are delivered by guards or other state or federal officer to a central headquarters for transporting the master recording tape through means, not shown in this view, for tabulating the votes cast throughout the political subdivision or other body for which an election has been held. A pair of corresponding cassettes, of which but one designated by the reference numeral 23' is shown in FIG. 2, remains in each polling place apparatus and is locked therein pending need therefor in case of loss, theft, damage or malfunction of the cassettes 23. It is to be understood that the master recording tapes used in our rapid preference may be stored for any desired period of time and may thereafter be erased and re-used.

In FIG. 3 of the accompanying drawings, we have depicted a typical scene at a central headquarters where votes cast during any given election day are being counted in a tabulator 31, which is shown schematically at the lower right of this view and which has a front panel which graphically and visually exhibits cumulative totals of votes counted at any given moment for each candidate and proposition for which the election has been held, as well as showing sub-total figures for each precinct's total vote for such candidates and propositions. In this view, a number of officials 32, 33, 34 and 36 are depicted for assisting in the routing and processing of the cassettes 23 and 24, which contain the master recording tapes 26 and the write-in paper tapes 27, respectively, not shown, and in order to reach a final total for each candidate and each propositions voted upon in a rapid and facile manner. One or more assistants 37 aid in moving the received cassettes to the desks 38, 39 and 40 of the officials; suitable compartmented carts 41 being employed for receiving and transmitting the cassettes in groups to the various desks. As indicated at the upper left of this view, an assistant 37 is shown moving a cart 41 of cassetes 23, each containing a master recording tape, not shown, from a receiving room to the desk 38 where two officials 32 and 33 are seated. One official 32 may act to remove an individual cassette 23 and call its precinct or code number to the other official 33 who records the called number upon a pad 33′, or checks the receipt of the cassette against a list of precinct numbers on pad 33′. After all the cassettes 23 in any given cart 41 have been checked in by officials 32 and 33, the carts 41 containing the master recording tapes 26 are delivered to official 34 who is seated at a control console, designated by the reference numeral 42, for operating the mechanism and electrical circuits, hereinafter described, of the tabulator 31. A main cable 43 is provided for containing a plurality of electrical conductors, not shown, which are connected to the operator's console 42 at their one ends and connected at their other ends to electrical circuits, not shown in this view, within the tabulator 31. Similarly, an electrical conductor 44 is provided for electrically connecting an electrical circuit, not shown, in the operator's console 42 to an internal electrical circuit, not shown, of a camera 46 which is set up on suitable legs 47 and focussed on the front panel of the tabulator 31.

While not forming parts, per se, of our present rapid preference system, a television camera 48 may be focused on the front panel of the tabulator 31 for transmitting the totals and sub-totals appearing on the front panel thereof to a closed circuit telecast station, not shown, over a cable 49 with the televised picture of the changing totals and sub-totals on tabulator 31 to be then telecast over cable 51 for reception in a television receiving set 52 that can be located at the central counting center for the convenience of persons interested in the returns and in the operation of our system. The locations of the tabulator console or official's desks as well as the locations of tabulator 31, cameras 46 and 48 and television set 52 are not at all critical but may be moved to any convenient locations in the central headquarters.

The transport of cassettes 24, containing the paper tape of write-in votes entered by voters at the various polling places or precincts are handled by officials 33 and 36: the former checking the received coded cassettes 24 against the prepared list 33′ of precincts and then having such cassettes 24 moved by an assistant and with carts 41 to the desk 40 where official 36 records the write-in votes on recapitulations sheets 36′ by removing individual coded paper tapes from the cassettes 24, tallying the votes cast by write-in for the candidate designated thereon, and then replacing the paper tape in the same coded cassette from which it has been removed and then transferring the cassette to a second cart 41 for removal to storage as indicated by the arrow designated by the reference character A. After recording votes in the tabulator, the election official places cassette 23 with its processed tape into a second cart 41; the completed or processed recording tapes within their cassettes 23 being moved by such second cart 41 to storage as indicated by the arrow designated by the reference character B.

All of the foregoing steps, except the actual processing of the individual master recording tapes through the tabulator 31 and the actual processing of the paper tapes containing the write-in votes through official 36 for recordation upon recapitulation sheets 36′, are optional and not critical; it being within the discretion of the election officials as to placement of the various components of our rapid preference system. A general receiving control desk for the cassettes and a release thereof for tabulation are not shown in FIG. 3 but suitable guards and safety means for handling these cassettes at the central counting station can be set up to preserve and maintain complete security of the cassettes and control consoles as well as tabulator.

Figures 4, 4A, 4B:
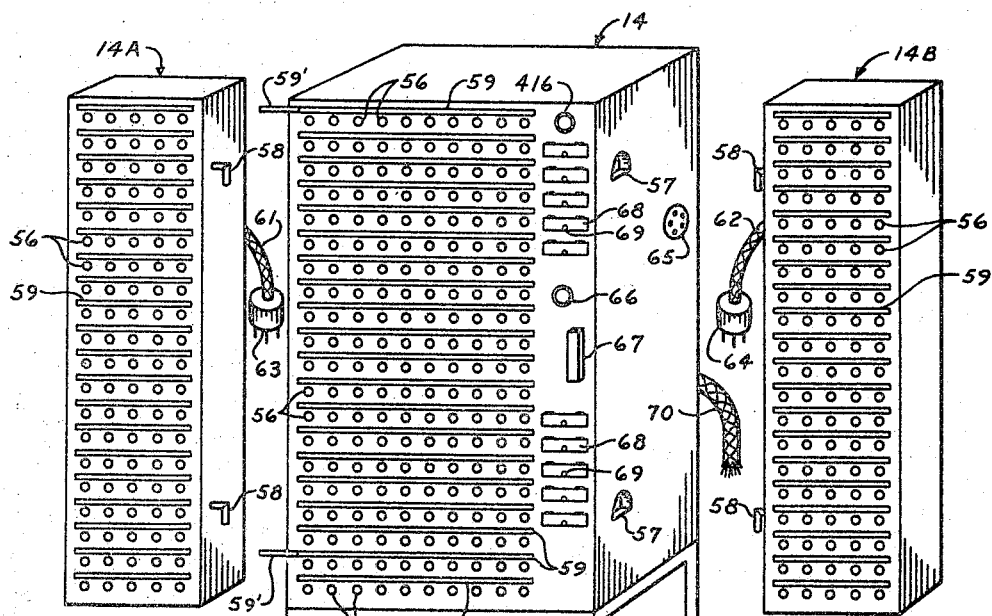
FIG. 4 is a front elevational view of a modular type polling place component employed in our preferred rapid preference system.
FIG. 4A is a front elevational view of a modular type attachment for removable mounting upon and use with the component illustrated in FIG. 4.
FIG. 4B is a front elevational view of a similar modular type attachment for removable mounting and use with the component in FIG. 4.
Figure 5:
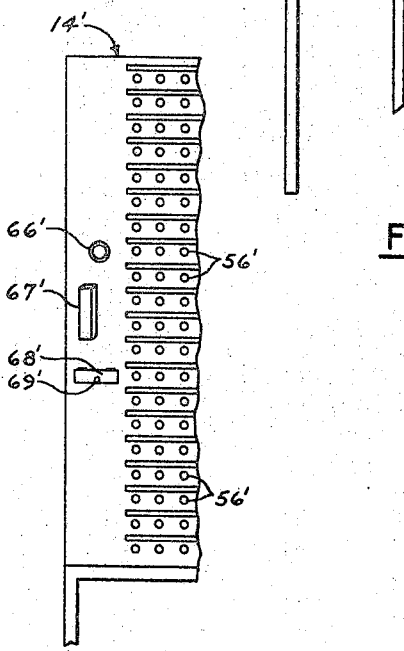
FIG. 5 is a fragmentary front elevational view of a modified polling place component, usable in lieu of the component shown in FIG. 4.

In accordance with our invention, each polling place apparatus 14, see FIGS. 4, 4A and 4B, preferably is of modular construction so as to readily accommodate it to size for any given election. The basic polling place apparatus illustrated in FIG. 4 provides two hundred preference-designating switches 56 for use by the voters, and also provides write-in vote facilities, indicator lights, a master vote-casting switch and the electro-mechanical means necessary for recording all individual voting preferences to accommodate the size of a normal off-presidential year ballot. Should greater ballot capacity require it, the modules of FIGS. 4A and 4B can be attached to polling place apparatus 14 of FIG. 4 by means of suitable recesses 57 formed in the sides of the unit of FIG. 4 for receiving projecting hooks 58 on the sides of the units 14A and 14B adjacent to the recesses 57 in unit 14. By the attachment of the units of the views of FIGS. 4A and 4B to the modular unit 14 of FIG. 4, there will be provided an additional one hundred switches 56 for each unit or a total addition of two hundred switches so as to provide a bank of four hundred movable switches 56 for use by a voter in designating his preferences on a ballot of approximately four hundred candidates seeking office, together with the for and against areas in connection with propositions to be voted upon. As indicated, each of the units of the polling place apparatus shown in FIGS. 4, 4A and 4B, as well as the fragmentary showing of FIG. 5, is formed with a plurality of rows of slots 59 therein for removably receiving strips, as at 59′, bearing the names of candidates and indicia with respect to propositions to be voted upon, such strips being removably inserted in the slots 59 at the time of preparing the polling place apparatus 14 for an election. The smaller units shown in FIGS. 4A and 4B are provided with cables 61 and 62 which terminate in plugs 63 and 64, respectively for interconnecting their contained branches of electrical circuits, not shown, with the primary electrical circuit, also not shown, contained within the larger unit of polling place apparatus illustrated in FIG. 4; such plugs 63 and 64 being removably inserted in sockets 65 formed in the sides of the unit of FIG. 4 and of which but one of the sockets 65 is shown.

The primary electrical circuit, hereinafter described, contains at least one indicator lamp 66 which may be removably mounted in a socket formed in the front panel of each polling place apparatus to indicate, when lighted, that the apparatus and its associated circuits are functioning by depressing a vote-casting switch 67 which is movably mounted in the front panel of each polling place apparatus and connected into an electrical circuit controlled from the judge's console 17, as subsequently described. That is to say, after each voter has completed his vote, by pushing selected switches 56 to their extreme inward positions, or by conditioning the equipment for a write-in vote he so informs the judge of the precinct who immediately closes an electrical circuit in which the indicator lamp 66 is connected; such indicator lamp 66 being mounted in a suitable socket installed in the front panel of each polling place apparatus 14 to inform the voter, when lighted, that he should depress the vote-casting switch 67 to record his vote on the master recording tape which is thereby moved or transported ahead, as is also the paper tape carrying all write-in votes made, to thus prepare the recording tapes and the paper tape for the succeeding voter.

Associated with each polling place apparatus are means to enable each voter to cast a vote or votes for a person or persons of his own choice, not shown on any of the above-mentioned strips constituting, collectively, the complete ballot for any given election. These means preferably comprise a series of doors 68, hingedly mounted on the front panel of the polling place apparatus above and below, if desired, the indicator lamp 66 and master vote-casting switch 67; such doors being operable by pulling on knobs 69 secured to the front surface thereof, see FIG. 4 of the annexed drawings. Behind the series of doors 68, the paper tape 27, not shown in FIG. 4, is moved intermittently; such paper tape being relatively wide and capable of covering an entire bank of candidates so that a voter can write in on the paper tape the name of his personal preference for Governor, for Mayor, or for Judge, etc., etc., by serially pulling out switches 56 of polling place apparatus 14 which are movably mounted adjacent to the particular offices for which a voter desires to make known his personal preference by a write-in vote. This arrangement could also provide for a series of individual paper tapes of narrower width, i.e., one tape for each office for which candidates are to be elected, in lieu of the relatively wide tape on which all write-in candidates could be delineated. Thus, the manner of effecting the write-in votes on the paper tape for candidates of one's own choice is not critical.

An alternative arrangement for write-in voting, exemplified in a modified embodiment of the front panel of each polling place apparatus, is illustrated in FIG. 5 of the annexed drawings and designated by the reference numeral 14'. In such modification, an indicator lamp 66' and master vote-casting switch 67', corresponding in all respects to the same elements 66 and 67 of the preferred embodiment, are suitably mounted for energization and actuation in the left hand side of the front panel of apparatus 14', or can be installed in the right hand side, as desired. To the end that write-in voting may readily be accomplished, we provide in each polling place apparatus 14' a hingedly mounted door 68' behind which an endless paper tape, not shown in this view, is moved intermittently and upon which a voter may write the name or names of a person or persons for whom he desires to cast a vote for a given office or offices; such paper tape being brought into view for receiving a write-in vote by pulling a knob 69' secured to the front surface of the door 68', see FIG. 5 of the drawings. As hereinafter described, the paper tape for receiving a write-in vote, cannot be brought into operative position until a switch 56, which is actuatable for casting a vote for any given candidate and office, has been pulled outwardly to its extreme out or locked position, thus preventing the casting of two votes for the same office by any given voter. The paper tape can thereafter be moved for permitting the writing-in of a name for another office, either by pushing in or pulling out of an adjacent switch 56. If pushed in, the door 68' cannot be opened notwithstanding the paper tape has been moved behind it. If a switch 56' is pulled out, the door 68' can be opened and another name written upon the advanced paper tape. In the preferred embodiment of polling place apparatus 14 of our present invention, the indicator lamp 66, the vote-casting switch 67 and the series of doors 68 for obtaining access to the paper tape for casting a write-in vote, are all mounted on the right side of the front panel thereof, but this is not critical.

Figure 6:
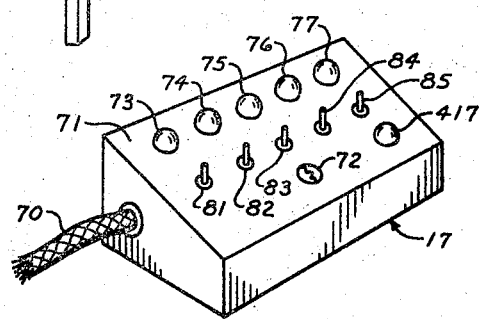
FIG. 6 is a perspective view of an official's control console constituting another component of our invention which is for use in association with the polling place component embodied in our rapid preference system.

As hereinabove mentioned, the primary electrical circuit of each polling place apparatus 14, including auxiliary circuits connected thereto, is controlled by an official from what may be termed a judge's console which has been designated herein by the reference numeral 17 and which is shown in perspective view in FIG. 6 of the annexed drawings; it being understood that one of such judge's console 17 is provided at each precinct for each polling place apparatus 14 required at such precinct and controls that one polling place apparatus to which it is connected. The electrical conductors for making the electrical control connections between each polling place apparatus 14 and a judge's console 17 are conveniently encased in an electrically insulated cable 70, shown in fragmentary form in both FIGS. 4 and 6. A master key lock switch 72 is provided in the judge's console 17, the key therefor being exclusively under the control of the precinct judge. The electrical circuit contained within the console is subsequently described but connected thereinto are a series of indicator lamps 73, 74, 75, 76 and 77 which are suitably removably placed in sockets mounted in console cover 71, and also a series of manually-operable switches 81, 82, 83, 84 and 85 for closing and opening the console-contained electrical circuits.

For a more detailed showing of the primary electrical circuit and associated circuits contained in each polling place apparatus 14 constituting a main component of a preferred embodiment of the present invention, reference is made to FIGS. 7, 28, 30, 31, 32 and 34 of the annexed drawings and it should be noted that FIG. 28A includes a fragmentary showing of the preferred master recording tape component of our rapid preference system, as illustrated separately in FIG. 14 of the accompanying drawings. It should also be noted with respect to FIGS. 7, 7A, 7B, and 7C, that while a bank of four hundred switches 56 are provided for in the modular type polling place apparatus 14, inclusive of units 14A and 14B, we have illustrated the switches and the circuits associated with such push-button switches 56, for the purpose of brevity and simplicity of illustration only, in relation to but three switch bodies. (One body consisting of two horizontally adjacent switches.) Similarly, the primary electrical circuit of each preferred polling place apparatus, shown in FIG. 28 in relation to the master recording tape, as well as the auxiliary plug-in circuits shown in FIGS. 30, 31, 32 and 34, are all illustrated in relation to but three switch bodies and the actuation of the switches thereof, as well as consequent energization of the circuits and elements thereof, including but five of the bank of twenty recording heads, and but five of the contact brushes, subsequently described.

Figure 7:
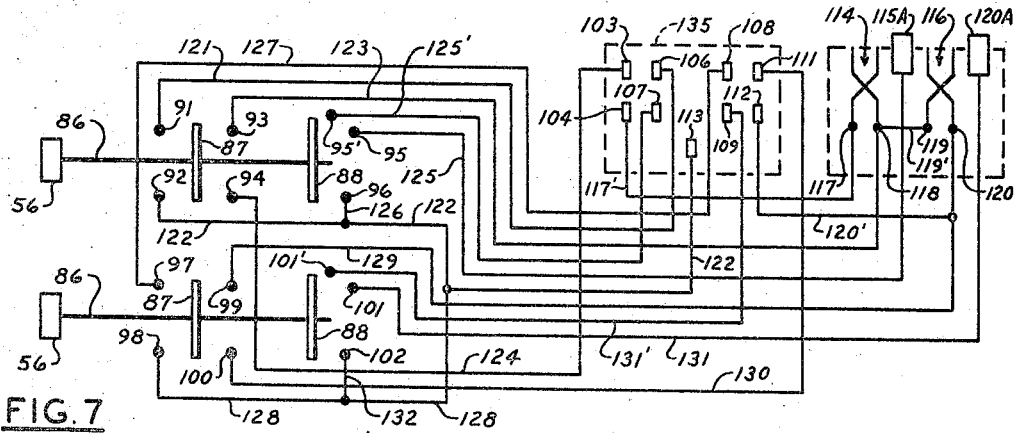
FIG. 7 is a schematic plan view of an electrical circuit asociated with the polling place component of our invention.

With particular reference to FIG. 7 of the annexed drawings it will be observed that each switch body consisting of a pair of adjacently disposed switches 56, movably mounted on the front panel of the preferred polling place apparatus 14 of our rapid preference system, preferably comprises a pair of electrically insulated shafts 86 which are arranged in spaced relationship, as shown, to permit of independent in and out movement by application of manual push or pull. Fixedly secured on each shaft 86 are a pair of electrically conductive contact bridges 87 and 88 which are arranged in spaced relationship to one another and which serve serially to span a series of switch body electrical contacts 91, 92; 93, 94; 95', 95 and 96; as well as 97, 98; 99, 100; and 101', 101 and 102; arranged in opposed pairs, when the push buttons 56 are moved to their extreme inner positions, which are their voting positions, and to their extreme outer positions, which are their lock-out positions permitting the entry of write-in candidates. The switch circuit also includes a series of terminals 103, 104; 106, 107; 108, 109; and 111, 112; arranged in opposed pairs, together with a common terminal 113 which, for purposes of explanation only, is connected to the positive side of the line, assuming that the alternating current circuit may be considered as including at once a positive side and a negative side. The push-button switch circuit also includes a pair of so-called spring connector switch elements 114 and 116, for the reception of plugs, not shown in this view, which span contacts 117, 118; and 119, 120; thereof, respectively. Also the circuit includes a pair of spade connector elements 115A and 120A. In each of these push-button switch circuits, a switch body contact 91 is connected to terminal 106 by conductor 121, and switch contact 92 is connected by lead 122 to positive terminal 113; while switch contact 93 is connected to spring connector contact 118 through lead 123, and the switch contact 94 is connected by lead 124 to terminal contact 103. Likewise switch contact 95 is connected to spade element 115A through conductor 125, while contact element 96 is connected by a lead 126 and conductor 122 to positive terminal 113. Turning to the other switch element 56 of the pair of push-button switches in each switch body 135, it will be noted that switch contact 97 is connected by a conductor 127 to terminal 108 while its opposed contact element 98 is connected by lead 128 and conductors 122 to positive terminal 113. Likewise, switch contact 99 is connected by leads 129 and 120' to terminal contact 112, and the opposed switch contact 100 is connected to terminal contact 111 by conductor 130. Also, switch contact 101 is connected to spade element 120A by a conductor 131, and opposed contact 102 is connected to the positive terminal contact 113 through a lead 132 and conductors 122 and 128.

Figure 7A:
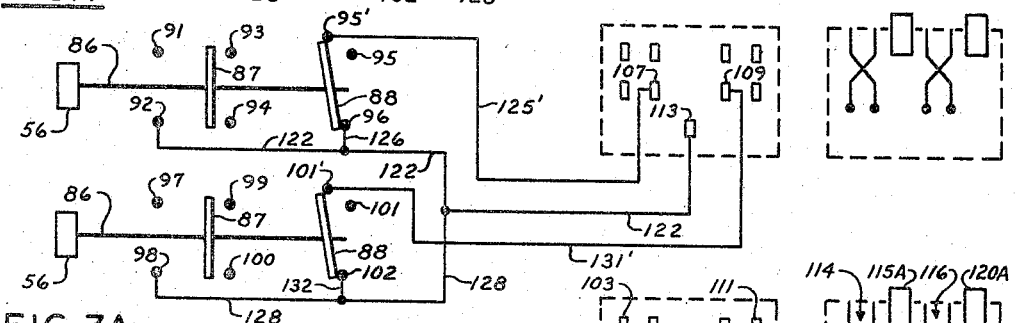
FIG. 7A is another schematic plan view of the circuit shown in FIG. 7, but with the push-button switch elements shown in a momentary position intermediate a neutral and a voting position thereof.
Figure 7B:
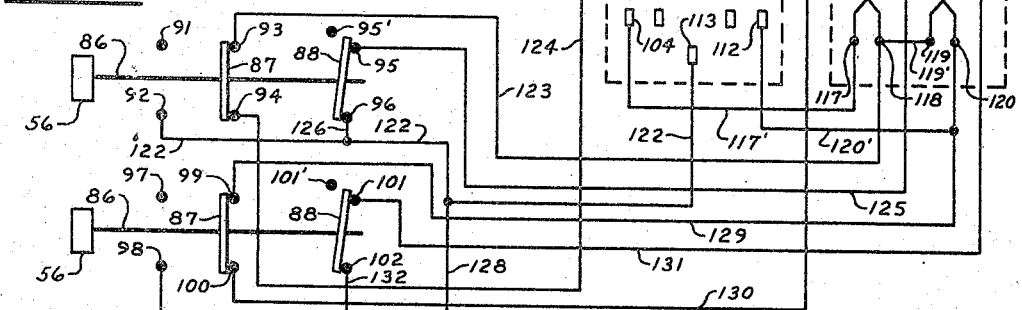
FIG. 7B is a schematic plan view of the circuit of FIG. 7, but with the switch elements illustrated in voting position.

Whenever it is desired by a voter to indicate his preference for any particular condidate or proposition on a ballot, he indicates such preference, secretly within the confines of the polling place apparatus, by pushing a switch 56, which is adjacent to that candidate's name or adjacent to the words "Yes" and "No" on the ballot strip contained in slot 59 of the front panel of the polling place apparatus, to its fully "in" position. The fully "in" position of each push-button switch 56 is shown in FIG. 7B which also shows the positions assumed by the bridges 87 and 88 in relation to the switch body contacts. Upon every push-in action on switches 56, momentary circuitry is established as illustrated in FIG. 7A. The momentary circuit is traceable from switch contact 95' over conductor 125' to terminal contact 107, with a return lead 122 connecting positive terminal contact 113 to the other bridged contact 96 and thence over bridge 88 back to switch contact 95'; while switch contact 101' of the other switch 56 of such pair of switches is connected by lead 131' to terminal contact 109, with return conductors 122, 128 and 132 connecting the positive terminal contact 113 to the other switch contact 102 and thence over bridge 88 to contact 101' to complete the momentary circuit established by such other switch 56 of the pair of switches in each switch body.

Figure 7C:
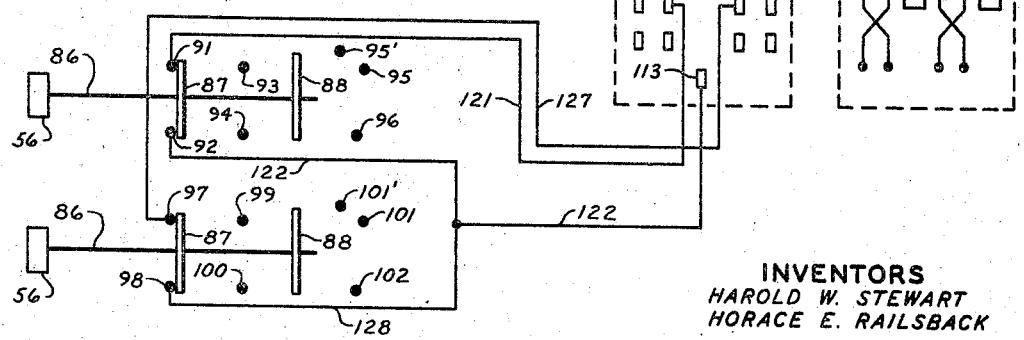
FIG. 7C is still another schematic plan view of the circuit of FIG. 7, but with the push-button switch elements in fully out or write-in vote position.

Upon every completely pull-out action on switches 56, the switch circuitry is established as depicted schematically in FIG. 7C. In describing the intermediate or momentary circuitry established as well as the circuitry upon fully pushed-in and fully pulled-out positions of the switches 56, reference has been and will only be made to the contacts, terminals, and spade connectors for which connections are made. For example, in FIG. 7A the energized circuit is closed from a source, not shown, to switch contact 95' and over conductor 125' to terminal 107, and thence through the circuitry hereinafter described and back through terminal 113 and conductors 122 and 126 to contact 96 and over bridge 88 to contact 95'. Also, the circuitry of FIG. 7A, in connection with the companion switch 56 of the switch body 135 shown includes contact 101', conductor 131' to terminal 109, and out over the hereinafter described circuit, and back to contact 102 through terminal 113 and the conductors 122, 128 and 132, and over bridge 88 to contact 101'.

With further reference to FIG. 7B, it will be noted that the two switches 56 are in their fully-in or voting positions. Upon the pushing of one switch 56 of the pair of switches shown to a voting position, a circuit is established from switch contact 93 over line 123 to contact 118 of spring connector 114, thence to spring contact 117 and over lead 117' to terminal contact 104 and thence out over a portion of the hereinafter described circuitry, schematically shown in FIG. 28, and back to terminal contact 103, and return over conductor 124 to switch contact 94 and over bridge 87 to contact 93. A second circuit is established, by the other switch 56 of the pair of switches contained in each switch body, from switch contact 99 over lead 129 to terminal contact 112 and to parallel contact 120 of spring connector 116, thence from contact 119 of such spring connector over lead 119' to the contacts 118 and 117 of spring connector element 114, and thereafter over lead 117' to terminal contact 104 and out over a portion of the circuitry shown in FIG. 28, hereinafter described, to return to terminal contact 111 and back to switch contact 100 over conductor 130 and thence over bridge 87 to contact 99. Moreover, the pushed-in position of the first switch 56 of the pair of switches shown in FIG. 7B causes one bridge 88 to span the switch contacts 95 and 96 which establishes a closed circuit from the contact 95 over lead 125 to spade contact 115A, thence cut through a portion of the circuit illustrated in FIG. 28, hereinafter described, and back through terminal 113 and conductors 122 and 126 to switch contact 96, and over bridge 88 to contact 95. In this same connection, the movement of the second switch 56 of the pair shown in FIG. 7B also causes another bridge 88 to span the switch contacts 101 and 102 and establish a closed circuit from switch contact 101 over conductor 131 to spade contact 120A, thence over a portion of the circuit shown in FIG. 28, hereinafter described, and back through terminal 113 and conductors 122, 128 and 132 to the switch contact 102 and over bridge 88 to switch contact 101.

The fully-out positions of the pair of switches 56 of the switch body, schematically shown in FIG. 7C, or the write-in positions of these switches, causes the movement of the two bridges 87 to span the switch contacts 91, 92; and 97, 98; with the establishment of one circuit from switch contact 91 over lead 121 to terminal 106, and back through terminal 113 and over conductor 122, to switch contact 92 and over bridge 87 to the contact 91. Also, another circuit from switch contact 97 over conductor 127 to terminal 108, and back to switch contact 98 through terminal 113 and the conductors 122 and 128, and over bridge 87 to contact 97. These established switch circuits will be considered and explained in conjunction with the circuitry shown in schematic plan in FIG. 34.

In accordance with our present invention, we provide means for re-setting all switches 56, or simultaneously returning all of the switches to their initial or neutral positions, after each voter has cast his vote, thus enabling the placement of all switches 56 in proper positions for use by each successive voter on any given election day. These means, together with associated elements, are illustrated in FIGS. 8–13 inclusive of the annexed drawings from which it will be observed that two adjacent switches 56 are movably mounted in a switch body 135; it being understood that for a format of four hundred switches 56, movably mounted on the front panel of a preferred embodiment of our polling place apparatus 14, inclusive of the units 14A and 14B, there would be two hundred switch bodies 135 removably installed upon each front panel of each polling place apparatus. The number of switch bodies 135 for any given polling place apparatus 14 depends upon the size of such modular apparatus to be placed at any precinct for use by the voters. As illustrated particularly in FIGS. 8–10 inclusive, which shows three different positions of a single switch 56, we provide a swingable link 136 for each switch and conveniently fulcrum the link on a shaft 137 which is fixedly supported within the switch body 135. To allow for the swing of each link 136 from a neutral position as shown in FIG. 8, i.e. depending vertically and normal to the switch shaft 86, to extreme right and left positions as shown in FIGS. 9 and 10 respectively, we provide a pin and slot connection, designated by the reference numerals 138 and 139, respectively, with the pin 138 projecting from the switch shaft 86 and the slot 139 in an extension of the link 136, all as shown in these three views. As indicated, each switch 56 is operable within the front plate 141 of each switch body 135, and the fulcrum 137 for each link 136 is fixedly supported in spaced relationship from the bottom 141' of the switch body 135.

Upon reference to FIGS. 8 and 11, it will be noted that we provide and rotatably support below the switch bodies 135 and in spaced relationship to one another a series of cam shafts, of which but two thereof are shown in FIG. 11 and journaled in suitable bearings 142 provided in a side wall 143 of the polling place apparatus 14; such two cam shafts being designated by the reference numerals 146 and 147. Formed integral with the provided cam shafts, for re-setting the switches 56, as well as limiting their movements to their extreme inner and outer positions, are a plurality of cams which conveniently are designated by the reference numerals 148 and 149 with relation to the cam shafts 146 and 147, respectively. Upon movements of each switch 56 from its neutral positions, as shown in FIG. 8, to a voting position, as shown in FIG. 9, each link 136 of each switch 56 is moved on its fulcrum 137 and by virtue of the pin and slot connection between the link 136 and its associated switch shaft 86, to a position engaging the shaft 147. On the other hand, a pull-out of each switch 56 to a write-in vote position, as illustrated in FIG. 10, the link 136 swings back through vertical and to the left to rest against the cam shaft 146. The cam shafts 146 and 147 thus limit the outward and inward movements of each switch 56. In order to re-set the switches 56 to their initial or neutral positions, as shown in FIG. 8, we provide means for rotating the cam shafts 146 and 147, including all similar shafts in the bank thereof in each polling place apparatus to cause the various cams 148, 149, etc., etc. to bear against and move the links 136 back to vertical positions: for example, the shaft 146 may be moved counter-clockwise and the shaft 147 may be moved clockwise. To this end, a set of gears 151 and 152 are keyed or otherwise secured to the shafts 146 and 147, respectively, in alignment with one another and for meshing engagement, as shown in FIG. 11. We also provide on the various cam shafts 146 aligned driven gears 153 and 154, arranged adjacent but not in meshing engagement with one another and journaled in suitable bearings 155 supported in side wall 143 of the polling place apparatus 14, and driven by means of a pinion gear 156 also journaled in bearings in the side walls of the apparatus 14, which is keyed or otherwise securely fastened to a driven shaft 157 that is coupled to a shaft 157' which, in turn, is driven from tape transport motor, hereinafter described and as shown in FIGS. 24, 25 and 31. Idler gears 150 transfer the rotation of gears 153 to gears 154 so that all gears 153 and 154 rotate in a sense which provides that shafts 146 at each level will rotate counter-clockwise as viewed in FIGURES 8–10.

With further reference to FIGS. 8–10 inclusive; it is to be noted that we provide means for locking switch elements 56 in their pulled out or write-in voting positions. While any suitable means may be employed for this purpose, we preferably form each shaft 86 with a notch 158 therein for the reception of a detent 159 which is a part of a spring element 160 encircling one of the cam shafts 146 adjacent to the switch body 135. The showing in FIG. 10 illustrates the detent 159 in the notch 158 since the switch element 56 has been pulled completely out, thus locking the switch in that position. Upon rotation of cam shaft 146 counter-clockwise, by virtue of driving the shaft 157 to operate the gear train above-described and only after a vote has been cast, the cam shaft 146, with its associated spring element 160, will cause the withdrawal of the detent or pawl 159 from the notch 158 in the switch shaft 86 to permit the switch to be returned to or be re-set in neutral position, as shown in FIG. 8.

As particularly illustrated in FIG. 13 of the annexed drawings, we provide a removable attachment, designated generally by the reference numeral 161, which may be installed on the switch bodies 135 for controlling the operation of the two switches of each switch body; such attachment being preferably installed on the polling place apparatus 14 and on certain switch bodies 135 in situations where the ballot to be voted upon contains propositions or candidates for offices where either a "Yes" or a "No" vote would be valid. As shown, the attachment 161 comprises a toggle or rocker arm 162 which is fulcrumed on a screw 163 that serves as means for removably installing the attachment on a switch body. The opposite ends 164 and 165 of the toggle 162 are the functioning parts of the toggle and, for purposes of explanation, we have designated the particular switch body shown in FIG. 13 by the reference numeral and the character 135A, and the contained switch elements by the reference numeral and characters 56A and 56A'. The full line showing of the toggle 162 indicates its neutral position as well as the neutral positions of switch elements 56A and 56A', while the dot and dash line showing of the toggle 162 illustrate assumed positions of such toggle when either switch 56A or switch 56A' is moved inwardly or outwardly. Suffice it to say, if switch 56A is moved inwardly to its extreme inward or voting position, as indicated by the dotted lines designated by the reference character c, the toggle end 164 will be engaged by the link 136A to swing the rocker arm 162 on its fulcrum 163 and cause its other end 165 to be moved against the link 136A', depending from the shaft of switch element 56A'. Thus if the switch 56A were to be used for recording a "Yes" vote for any given candidate or proposition the switch 56A' would ordinarily be used for casting a "No" vote for the same such candidate or proposition. If it is assumed that the switch 56A were pushed to its extreme inward position, subsequently pushing in the switch 56A' would cause the switch 56A to resume its original position, as shown by the solid lines at b in FIGURE 13. The converse of course, will be true if the switch 56A' were first pressed and the switch 56A were subsequently pushed to its inward position. As indicated by the dotted lines and reference characters a and a', either the switch 56A or 56A' may be pulled outwardly to its write-in position. The switch toggle attachment is shown in dotted lines in FIGURES 8 to 10.

In accordance with our invention, we provide a pair of specially formed identical master recording tapes, designated generally by the reference numeral 26, for use in each polling place apparatus 14 to record the preferences made by each voter with respect to any given ballot at any given election; such tape 26 being shown in fragmentary view in FIG. 14 of the annexed drawings. In general, this specially formed tape 26 is keyed to the format of the front panel of each modular polling place apparatus, and in describing such tape the equipment illustrated in FIGS. 4, 4A and 4B shall be considered together so that the front panel of each polling place apparatus 14 actually comprises twenty rows of twenty push-buttons 56 to provide for the making of four hundred preferences with respect to a ballot containing that number of candidates and propositions to be voted upon. Preferably, each tape 26 is fabricated from a suitable plastic stock of which approximately one-half of one side thereof is coated with a layer of ferric oxide, or other suitable substance, to render such half of the tape throughout its entire length capable of receiving and retaining magnetically recorded bits; the other half of the tape remaining plain or free of any coating of ferro-magnetic material or coating of any chemical or other substance. In the preferred embodiment of tape component shown in FIG. 14, the upper transverse half of the tape 26 is plain and the lower half thereof is coated with ferric oxide, as indicated by the multiplicity of dots designated generally by the reference numeral 182. Each of the master recording tapes 26 is pre-punched in a succession of plain surface zones 183 thereof throughout substantially its entire length with a diagonally arranged succession of slots 184 which may take any form such as circular or rectangular, as shown. As illustrated the succession of slots 184 commence adjacent to the upper margin or edge 186 of the tape and descend in spaced apart relation diagonally to adjacent the transverse center of the tape. Inasmuch as the preferred tape component 26 is to be employed with respect to the format of twenty by twenty, or four hundred, switches 56 in the front panel of each polling place apparatus 14, we provide twenty slots 184 in each zone 183 of the tape, immediately followed by a single slot 187 arranged in spaced relationship to the lowermost or last slot 184 in each descending diagonal series of slots in each zone 183 of the tape. In addition, we delineate a serial number or code number, as indicated at 188, on each of the tapes 26 for purposes of proper identification.

It is within the purview of our present invention to provide different formats of modular type front panels for each polling place apparatus 14 and to correlate with such different formats different master recording tapes. For example, we may provide a format of front panel for a polling place apparatus, in cases where the number of candidates and the ballot itself is not large, wherein but five rows of five switches 56 are utilized. In such event, a preferred master recording tape designated generally by the reference numeral 191 and illustrated in FIG. 14A can be employed. In this exemplification, the tape 191 can be formed with an alternation of plain zones 192 and of zones coated with ferric oxide, designated generally by the reference numeral 193 and indicated by the plurality of dots. Each tape of the exemplification of FIG. 14A is pre-punched in the plain zones 192 thereof with a diagonally arranged succession of holes or slots 194, with the slots commencing adjacent to the upper edge 196 of the tape and extending in spaced relationship to one another and descending diagonally to adjacent the lower edge 196' of the tape. While not shown, each of the tapes 191 can be delineated with identifying indicia, in code, as in the case of tape 26.

Another exemplification of a preferred master recording tape component is illustrated in FIG. 14B and designated generally by the reference numeral 201; such exemplification being employable with a different modular format of polling place apparatus as described hereunder. The tape 201 conveniently is formed with a plurality of alternations of plain zones 202 and of zones 203 coated with ferric oxide, indicated by dots and designated generally by the reference numeral 203. The tape is pre-punched in the plain zones 202 throughout the length of the tape with single circular holes 204 which, of course, could be made to any shape or could be slits or slots, as desired.

In FIG. 14C, we have illustrated a still further exemplification of a preferred master recording tape, designated generally by the reference numeral 26', which is a counterpart or reverse of the tape 26 shown in FIG. 14 in that the plastic ribbon is coated throughout substantially its entire length along the upper portion hereof with a substance 182', such as ferric oxide, capable of receiving and retaining electro-magnetically recorded charges which have come to be known in the art as bits, such ferric oxide being applied across approximately one-half of the width of the tape. The remaining transverse half or lower portion of the plain plastic surface is pre-punched throughout substantially its entire length and in zones 183' in spaced relationship to one another with a plurality of slots 184' which may be rectangular, as shown, or which may take any desired configuration. In the exemplification of FIG. 14C, the slots 184' are arranged in a descending diagonal pattern in spaced relationship to one another and terminating adjacent the lower edge 186' of the tape. A series of separate slots 187' are fashioned or provided adjacent to the lower edge 186' of the tape and just below the lower slot 184' in each zone 183' of the tape, for purposes hereinafter explained. Suitable indicia 188' can be delineated on tape 26' to identify the same.

A still further exemplification of a master recording tape which can be effectively employed with a format of switches 56 in a front panel of a polling place apparatus 14, that is different from the formats hereinabove described, is illustrated in fragmentary plan view in FIG. 14D and is designated generally by the reference numeral 206. In this exemplification, means in the form of a series of holes or perforations 207 arranged in spaced succession along a straight line parallel to the upper edge 208 of the tape 206 are provided for transporting the same in a linear direction, preferably utilizing a sprocket wheel therefor, not shown, in the usual manner. The tape 206 is fabricated of conventional plastic stock and is coated throughout substantially its entire length with a band 209 of ferric oxide at substantially the transverse center of the tape leaving opposite sides of the band 209 plain or uncoated, as indicated by the reference numerals 211 and 212. In each of the plain areas 211 and 212 of the tape 206, we pre-punch a plurality of series of holes 213 which preferably are arranged, as shown, in descending diagonal patterns with the patterns in area 211 aligned with the patterns of holes 213 in area 212 of the tape. As with the other exemplifications of the master recording tapes employable in our rapid preference system suitable indicia 214 can be delineated on the tape pursuant to a pre-arranged code so that the tape can be readily authenticated.

In FIG. 14E, we have illustrated in fragmentary plan view a specially formed recording tape, designated generally by the reference numeral 26A and being fabricated of a suitable plastic; such specially formed recording tape being fashioned from one-quarter inch plastic magnetic tape available on the market and being usable with the specially designated recording head illustrated in FIGS. 29, 29A and 29B of the annexed drawings and more particularly hereinafter described. As shown, the tape 26A is coated from side to side on at least one surface thereof and throughout substantially its entire length with a substance 217 such as ferric oxide, capable of receiving and retaining bits which are usually electro-magnetically applied to the tape. The tape 26A is prepunched with a linearly arranged plurality of slots 184A' to 184E', inclusive, in spaced relationship to one another and through which contact brushes, not shown in this view, protrude for engaging an electrical contact, also not shown in this view. Suitable coded indicia 219 can be delineated or recorded and stored on the tape 26A for purposes of authentication.

It is to be understood that the lengths of the tapes illustrated in FIG. 14 through 14E can be as desired. Usually, the length of the tape employed in our system is sufficient to accommodate bits recorded thereon during an election day by the number of registered voters at each given precinct, or those entitled to cast votes in an election conducted by organizations other than political bodies or subdivisions.

Figure 17:
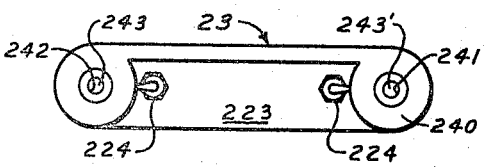
FIG. 17 is a rear elevational view of the cassette shown in FIG. 15.
Figure 18:
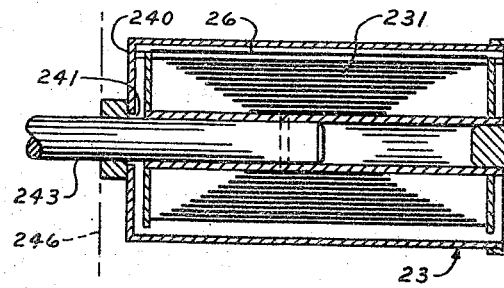
FIG. 18 is horizontal sectional view of the cassette with fragmentary showing of tape transport, this view being taken on the line 18—18 of FIG. 15.
Figure 19:
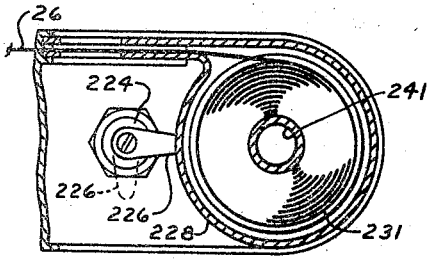
FIG. 19 is a fragmentary longitudinal sectional view taken on the line 19—19 of FIG. 15.
Figure 20:
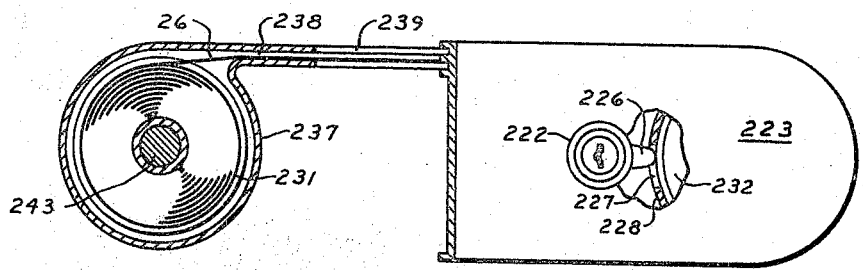
FIG. 20 is a broken sectional elevational view of the cassettee, taken on the line 20—20 of FIG. 15 and broken away to show the latching mechanism.
Figure 21:
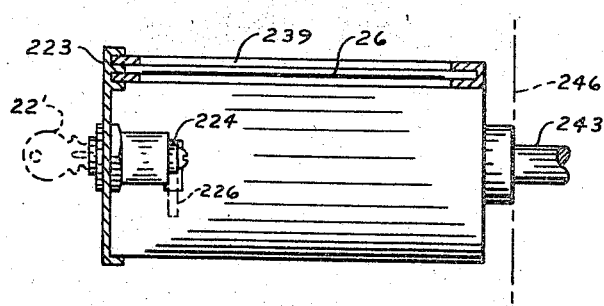
FIG. 21 is a sectional elevational view of the cassette, this view being taken on the line 21—21 of FIG. 15 and showing an inserted key in dotted lines.

In order to transport the master recording tape 26 within each polling place apparatus 14 of the preferred embodiment of our invention, and at the same time protect the same from tampering or damage, for receiving bits thereon designated by the preferences of each individual voter, we provide a tape holding cassette, generally designated by the reference numeral 23 and conveniently taking the form and shape illustrated in FIGS. 15–21 of the accompanying drawings. Preferably a pair of identical cassettes 23 and 23', each retaining and permitting transport of a master recording tape 26, are provided and removably mounted in operative position in each polling place apparatus 14, but one of such cassettes 23 being removed from each polling place apparatus 14 at the close of each election day, all as indicated in FIG. 2 of the annexed drawings, with the other cassette 23' of the pair of cassettes remaining in the polling place apparatus for possible future use or reference. Since the cassettes 23 and 23' are identical only the cassette 23 is described hereinafter. Each cassette 23 preferably is fabricated of a ferrous metal of sufficient gauge to prevent intentional or accidental magnetic damage to the information stored within the cassette and is fashioned with a pair of spaced key holes 221 and 222 in its front plate 223 for the reception of a locking element 224 for unlocking by keys 22' in the possession of separate trusted officials 18 and 21, see FIG. 2 of the drawings, of which one may be the judge at any given precinct. As shown in FIGS. 19 and 20, the tumbler locking element 224 of each lock in each cassette 23 includes a projecting pin 226 which engages a slot 227 formed in the periphery 228 of the head of each spool over which the tape 26 is trained, hereinafter described, whereby each lock may be completely locked and unlocked with keys 22'. As indicated, each master recording tape 26 is trained over a pair of spools 231 and 232 which are rotatably supported as hereinafter specified. Each master recording tape 26 is initially wound entirely upon one spool of the pair of spools 231 and 232 prior to insertion of the spools within the cassettes 23, in preparing each polling place apparatus 14 for use and the free end thereof is withdrawn and the tape is partially wound upon the other or take-up spool, say the spool 231, upon which it is fully wound during an election day and upon which the bits have been recorded and stored in response to the preferences selected by the voters. A removable cover 223, see FIGS. 18 and 21, is provided on each cassette 23 for access to the tape 26 when each cassette is unlocked. The interior of each cassette 23 is so formed as to provide a circular interior guide wall 237 which, with another wall of the cassette, defines a channel 238 through which the unwinding and winding tape 26 is guided past a through-opening 239 of the cassette where the bits are applied to the tape during its transport. The rear plate 240 of each cassette 23 is formed with a pair of openings 241 and 242 arranged in spaced relationship as shown in FIG. 17, for the passage of driving spindles 243, 243' which extend through the hollow shanks of the spools 231 and 232 of the two cassettes for rotating the same.

In accordance with our present invention, means are provided for transporting two master recording tapes 26 within each polling place apparatus as voting takes place on an election day, and means are also provided for electromagnetically applying bits to each of said recording tapes 26 corresponding in locations on said tapes to the locations of the switches 56 of each polling place apparatus 14 that have been actuated by each voter. It is understood, of course, that the tapes 26 are transported intermittently and upon the casting of his vote by each voter, by depressing vote-casting switch 67 on his particular polling place apparatus 14, see FIG. 4. These means, in part are illustrated in FIGS. 22–27 of the annexed drawings from which it will be noted that we provide a housing 246 within each polling place apparatus 14, which is accessible from the rear of each apparatus after unlocking rear hinged door 247 thereof, see FIG. 2, in which are supported a standard motor 248, on the shaft 249 of which is keyed or otherwise secured a bevel gear 251 which is in meshing engagement with a bevel gear 252 carried on a shaft 253. The shaft 253 carries a male member 254 of an electrical clutch, designated generally by the reference numeral 255, with the female element 256 of the clutch keyed on the inner end of the driven shaft 253; which is suitably journaled in bearings 257 contained in the body 258 secured to the floor of the housing 246; while the spindles 243 are journaled in bearings contained in housing 259 supported on the front and rear of casing 246. A relay 260, which forms one component of the re-set circuit subsequently described herein, is conveniently supported within housing 246, as shown. The tape transport also includes a pinion gear 261 which meshes with a gear 262 that is keyed to lower spindle 243 and gear 262, in turn, meshes with a gear 263 on upper spindle 243 which is journaled in bearings contained in casings 264 at the front and rear of housing 246. As shown in FIG. 22, the two take-off spools 232 are carried on upper and lower spindles 243', and the two master recording tapes 26 are initially wound up entirely on such spools 232 from which they are unwound during transport of the tapes, upon the casting of votes, to be wound up on spools 231 which are driven by the spindles 243 which extend from the housing 246 toward the rear of polling place apparatus 14. The electrical circuit containing motor 248 for operating the tape transport is shown in FIG. 31, which circuit also contains the paper transport motor 248' that drives shafts 266' and 267', see FIG. 33A, on which spools 266A and 266B, respectively, are mounted and over which spools the paper tape is trained.

As particularly illustrated in the enlarged views of FIGS. 22 and 26, each polling place component 14 of the preferred embodiment of our invention is provided with means for storing bits on each of the master recording tapes 26 transported within the two cassettes 23 which are removably installed in each polling place apparatus 14. These means comprise, in the case of a format of front panel for the polling place apparatus embracing four hundred individual switches 56 which would include, therefore, the units shown in FIGS. 4, 4A and 4B, twenty individual recording heads, designated generally by the reference numeral 271, together with twenty individual contact brushes, plus a twenty-first brush for the purpose hereinafter set forth which are generally designated by the reference numeral 272, with the recording heads and contact brushes arranged in linear or straight line succession and in spaced apart relation as clearly shown in FIG. 26. All of these recording heads and contact brushes 271 and 272, respectively, are conveniently mounted in a spring-loaded casing 273 which is pivotally supported by means of a pivot pin 274 upon a bracket 276 secured to and extending from the rear wall 277 of the housing 246; the spring-loading being effected by means of the spring 278 coiled about and anchored to pin 274. The means for applying the bits on the two master recording tapes 26 also include an electrically energized tone plate 279, which is supported within each polling place apparatus 14 so as to be disposed between the two master recording tapes 26 and to underlie the opening 239 of the cassettes 23. As each master recording tape 26 advances across the opening 239 of the cassette, upon depression of switch 67 by each voter to cast his vote, the contact or pick-up brushes 272 will engage the tone plate 279 through diagonally aligned openings 184 of tape 26, thereby being energized to cause the tone to be fed sequentially on horizontal buses hereinafter designated through switches 56, see FIG. 7B, and over vertical buses, to the recording heads 271 which are in circuit with the particular switches 56 that have been actuated by the voter in making his preferences, all as described hereinafter with reference to FIG. 28 of the annexed drawings, thereby to record bits on the ironized portion 182 of the recording tapes 26. The pivotal mounting of the bracket 276 permits the casing 273 which houses the plurality of recording heads 271 and contact brushes 272, respectively, to be moved aside while the cassettes carrying the recording tapes 26 are initially installed or removed from spindles 243 and 243'.

In FIG. 27, we have shown a spring-loaded casing 273' which is pivotally mounted by means of a pin 274' on a bracket 276' secured to and extending from the rear wall 277 of the housing 246; the spring-loading of casing 273' being effected by means of a spring 278' coiled about and anchored to pin 274'. The casing 273' houses a pair of spaced apart plates 271' and 272'; the former plate 271' affording a rigid backing surface against which the recording heads 271 bear when bits are recorded to the recording tapes 26.

In acordance with our present invention the preferred embodiment of our rapid preference system comprises a primary electrical circuit in each polling place apparatus 14 forming a component of the system, such primary polling place component circuit being schematically shown in plan view in FIGURES 28 and 28A taken together and connected by the common lines 291 to 295, 301 to 305, and 316. For the sake of brevity and clarity of description, the drawings relate only to twenty-five switch circuits and five each of the recording heads and contact switches, as well as with relation to but five of the slots 184 of the master recording tape 26 to indicate the designation of but twenty-five preferences made by a voter. The open arrowheads 281, 282, 283, 284, and 285 at the right of FIG. 28 indicate that the format of any given polling place apparatus 14 has an indeterminate number of columns of switches 56, while the open arrowheads 286, 287, 288, 289, and 290 indicate that the format of any given polling place apparatus 14 may have an indeterminate number of rows of switches 56; it being understood that the switch and circuit format in every case preferably is modular to allow the formation of 10×10 or 20×20 voting units, and the like. The primary polling place component circuit is connected into any convenient source of 115 volt 60 cycle alternating circuit, as indicated by the plus and minus signs at the center right of FIG. 28A, by any conventional plug, not shown; for engaging a standard outlet box, also not shown.

The circuitry of FIGURE 28 and 28A has, in part, been designated with reference numerals and characters, insofar as switches 56 of the format of the polling place apparatus 14 is concerned, with the same reference numerals and characters as are used in FIG. 33A, in order to clarify a description of such primary polling place component circuit, as shown in FIG. 28, with relation to the casting of a vote by any given voter. It will be noted that each contact brush 272 is electrically connected to a separate horizontal bus, common to a row of switches 56 in the polling place apparatus 14 and that each recording head 271 is electrically connected to a separate vertical bus of a plurality thereof hereinafter specified, common to a column of switches 56 in such apparatus 14. Thus, a contact brush 272 is connected through an electrical conductor 291 to a horizontal bus 296; a second contact brush 272 is connected through electrical conductor 292 to horizontal bus 297; a third brush 272 is connected to the horizontal bus 298 through conductor 293; a fourth contact brush is electrically connected through a conductor 294 to horizontal bus 299; and a fifth contact brush 272 is connected through electrical conductor 295 to horizontal bus 300. The same connections would be made for additional contact brushes 272 of an extended format of polling place apparatus 14. Similarly, each recording head 271 is electrically connected to a series of electrical conductors 301, 302, 303, 304 and 305, hereinafter termed vertical buses, respectively, through the switches 56 that are in voting or fully in position. The same connections would be made for the additional recording heads of a format containing more recording heads than the five designated and illustrated in FIGURES 28 and 28A. The contact plate 279 is electrically connected in series with a conventional tone generator or oscillator and amplifier, shown schematically and designated generally by the reference numeral 311, which is connected across a pair of conductors 312 and 313 leading from a source of potential sufficient to meet requirements of the tone or oscillator amplifier circuit as indicated. All of the recording heads 271 are connected in parallel to a common bus 314 which is directly connected to the oscillator and amplifier 311, as indicated at the bottom of FIG. 28A. Suitable diodes 315 are connected into each horizontal bus to prevent feed back. The control circuitry of each polling place apparatus 14 of our preferred embodiment of our rapid preference system obtains its power or energy from a source of 115 volt, 60 cycle alternating current, not shown, which is supplied through electrical conductors 316 and 317, sometimes referred to herein as main conductors 316 and 317. As illustrated in the schematic plan view of FIG. 28, main conductor 316 is connected to the series of power buses 306, 307, 308, 309, and 310 by a common bus 316'; such power buses being, in turn, connected serially to terminal contacts 113 of each switch body 135 throughout the entire format of switch bodies and switches 56 in each polling place apparatus 14 so that the switch circuits, hereinabove described with respect to FIG. 7, derive their electrical energy from such terminal contacts 113 and such power source over main conductors 316 and 317.

It may be observed at this point that because of space limitations, the showing of switches and of the switch contacts in FIG. 28, as well as patch points therein, indicate such switches in relation to the specific switch contacts connected into the primary circuit of each polling place apparatus 14 when the switches 56 are moved to their three attitudes, see FIGS. 7B, 7C and 7A; namely, their fully in position; their fully out positions; and their momentary positions between neutral and fully in positions, together with portions of components for connecting such switch contacts to auxiliary circuits hereinafter described and which may be patched into the primary electrical circuit of each polling place apparatus 14. It is to be understood that while the numerals and reference characters have been directed to all such contacts and associated switches in relation to but horizontal bus 298 because of limitation of space, the same numerals and reference characters obtain for all switches 56 throughout the entire showing of FIG. 28 and throughout the entire switch format and primary electrical circuit of each polling place apparatus.

Thus, the power supplied to terminal contact 113 by means of vertical bus 306 is transmitted over conductor 122 to switch contacts 92, 96 of one of the switches 56 in each switch body 135 and by means of a conductor 128 to the switch contacts 98, 102 of the companion switch 56 of the same switch body 135, so that circuits will be closed in the three attitudes of the switches through bridge 88' between switch contacts 91, 95 or 95' of the one switch and switch contacts 97, 101 and 101' of the other or companion switch (alternately, the electrical connection shown in FIGURE 28 as made by bridge 88' would as well be made by bridge 87' when it is realized that terminals 92 and 96 are electrically common), thence to spade connector 115A and terminals 107 and 106 from the switch contacts 95, 95' and 91, respectively, over conductors 125, 125' and 121, respectively, and thence to auxiliary circuits hereinafter described, or to spade connector 120A and terminals 109 and 108 from the companion switch contacts 101, 101' and 97, respectively, over electrical conductors 131, 131' and 127, respectively, and thence to auxiliary circuits subsequently described, and return from such auxiliary circuits, see FIGS. 30, 31, 32 and 34, over conductors 317A, 317B, 317C and 317D to the other supply or main conductor 317 through terminal block 317E, to complete the circuitry of FIG. 28 as to power supply from its source through terminal block 316E.

In order to correlate the showings of the switches 56 in FIG. 28 with similar switches, indicated by the solid dots and designated by certain reference numerals and characters in FIG. 33A, and to assist in the description, we have used the same matching reference numerals and characters for designating the switches 56 in FIG. 28 of the drawings. Thus, the switches 56 are shown in the panel of FIG. 33A and in the schematic plan of the electrical circuit of FIG. 28 containing such switches by the reference numerals and characters of A1, A2, A3, A4 and A5 in the top horizontal bus 296; as B1, B2, B3, B4, and B5 in the next lower horizontal bus 297; as C1, C2, C3, C4 and C5 in the next horizontal bus 298; as D1, D2, D3, D4 and D5 in the succeeding horizontal bus 299; and as E1, E2, E3, E4 and E5 in the last or lowest horizontal bus 300. With further reference to FIG. 28A, it will be observed that we have indicated five of the pre-punched rectangular openings 184 of the master recording tape 26 in enlarged staggered relationship with respect to the tone or contact place 279 and with respect to the recording heads 271 and contact brushes 272; such enlarged rectangular openings being designated sequentially by the reference numerals and characters 184A, 184B, 184C, 184D and 184E. Assuming that a voter has pushed to voting positions the switches A1, A4, B2 B3, C5, E2, and E5, see FIG. 33A, as his voting preferences and the judge has notified the voter by the energization of the lamp 66, see FIG. 4, the voter then presses the vote-casting switch 67, see FIG. 4 and FIG. 31, which actuates the tape transport mechanism, above described, to advance the master recording tapes 26 over the tone or contact plate 279, and the pick-up or contact brushes 272 are energized successively with consequent successive energization of horizontal buses 296–300 inclusive. Simultaneously, the vertical buses containing a closed switch 56 will be successively energized as will also the recording heads 271. To follow the pattern of switches closed by the assumed voter, it will be observed with reference to the circuit shown in FIG. 28, that as conductor 291 is energized by the transport of tape 26 with engagement of a contact brush 272 with the electrically energized contact plate 279, the tone will feed through the fully pushed in switches A1 and A4 and from such switches through vertical buses 301 and 304 to the recording heads 271A and 271D thereby to record bits on the ironized zone of tape 26. By virtue of the transport of the master recording tapes 26, the bits applied by recording heads 271A and 271D are in a definite geographical location on the tape 26 in relation to the slot 184A so that another contact brush 272 passes through a succeeding slot 184B and engages contact plate 279 to effect energization of conductor 292 which, in turn, energizes the entire horizontal bus 297. Since switches B2 and B3 in horizontal bus 297 have been moved to voting positions, the tone is carried through the contact of such switches to vertical buses 302 and 303 and to recording heads 271B and 271C with bits again applied to the tape 26 in a definite geographical relation to the slot 184B of the tape but in a different area thereof than the bits previously recorded onto the tape when recording heads 271A and 271D were energized.

It will be clear that the conductors 293, 294 and 295 will sequentially be energized by engagement of contact brushes 272 with underlying contact plate 279 successively as the tape 26 is transported to permit passage of the contact brushes successively through the slots 184C, 184D, and 184E of the master recording tape 26. By such energization, the horizontal buses 298, 299 and 300 will be successively energized and wherever switches in such horizontal buses have been moved to voting positions, associated vertical buses and recording heads connected thereinto will be energized. Thus, following the pattern of the assumed example, closed switch C5 will permit the tone to be fed to recording head 271E through energized vertical bus 305, thereby effecting the recording of another bit on the tape 26 but in a different location from the other bits because the tape 26 has been advanced. The feeding of the tone through horizontal bus 299 is not important in the pattern of pushed-in switches because in the assumed example, no switches were moved into a voting position. However, the feeding of the tone through horizontal bus 300 will effect the recordation of additional bits by recording heads 271B and 271E because switches E2 and E5 in horizontal bus 300 had been moved to voting positions. It is to be understood, of course, that the electrical connections between the contact brushes 272 and the horizontal buses containing the switches 56 need not be in any set sequence nor need the connections between the recording heads 271, embodied in vertical buses to which the switch contacts are connected, be in any set sequence, as it is within the purview of our invention to make these connections in any arrangement desired as long as the tone is effectively transmitted to the recording heads for the recordation of bits on the tape 26 as it is transported, corresponding to the designation of preferences by each successive voter.

At the completion of the recordation of bits on the master recording tape 26 for each vote-casting operation, that is to say upon the casting of votes by each voter, the tape 26 is automatically brought to a halt by the energization of a portion of the auxiliary electrical circuit shown in schematic plan view in FIG. 31 of the annexed drawings, which is hereinafter more particularly described. Suffice it to say at this point that one of the contact brushes, designated hereinafter as stop brush 272S, will engage a second underlying contact plate 279', which is not connected to tone plate 279, through a slot 187 of the master recording tape 26 which, as shown in FIG. 14, is adjacent to but spaced from the lowermost slot 184 of each series of diagonally descending slots 184. The contact of stop brush 272S with underlying energized plate 279' energizes relay 260, including re-set coil 372, see FIG. 31, to effect the disengagement of clutch 255 from the shaft of tape transport motor 248 thus stopping the rotation of wind-up spool 231 and transport of tape 26. After the re-setting of all switches 56 for use by each successive voter and the movement of selected switches 56 thereafter to their voting positions, upon depression of vote-casting switch 67 by such successive voters, in sequence of operations, the circuitry containing tape transport motor 248, hereinafter more particularly described, will be energized to effect the reengagement of clutch 255 with the motor shaft to again transport tape 26 where the designations of each successive voter are recorded as bits on the tape until stop contact brush 272S again passes through a succeeding slot 187 to engage underlying contact plates 279' to again energize re-set coil 372 of relay 260 to again effect disengagement of clutch 255 from the motor shaft of tape transport motor 248 to halt the transport of the tape. This cycle is repeated again and again throughout an entire election day as each voter casts his or her vote.

An auxiliary electrical circuit preferably installed in each judge's console 17 for each polling place apparatus 14, and electrically connected thereto, is depicted in schematic plan view in FIG. 30 of the annexed drawings. From this showing, it will be noted that this circuitry includes the master keylock switch 72 which upon opening of the polls on each election day, is locked in closed position by the judge of each precinct, and remains closed until the polls close. Thus, 115 volt 60 cycle alternating current is supplied to conductor 316A of the primary electrical circuit of each polling place apparatus 14, the circuit being completed through 317A, see FIG. 28A, throughout each election day, and this circuit as well as all auxiliary circuits are controlled from the judge's console 17. After a voter has notified a judge that he has completed his designation of preferences by the movement of selected switches 56 to their voting positions and has effected his write-in candidates on paper tape 27, the closing of the switch 81 by the judge will not only energize the lamp 66 in the polling place apparatus but will, when the voter closes switch 67, light the lamp 73 on the judge's console 17 and effect energization of conductor 319 in which the coil of relay 260 is connected and thereby to effect the engagement of clutch 255 with the shaft of tape transport motor 248, see FIG. 31, to start the motion of master recording tape 26.

It is to be understood that portions of the auxiliary electrical circuit of FIG. 30 may or may not be used. When it is used, such as in primary elections, the circuitry is connected to the primary electrical circuit of each polling place apparatus 14 by removal of connecting links, hereinafter explained, of the particular horizontal buses of such primary electrical circuits which are to be controlled. For example, should any given primary election have such a number of candidates on the Republican ticket as to require two complete rows of switches 56 of each polling place apparatus 14, then the switches 56 associated with and connected to horizontal buses 296 and 297, see FIG. 28, of each primary electrical circuit of apparatus 14 are set up and reserved for the exclusive ballot of the Republican Party voters. To this end, the requisite portion of the circuitry is patched into such horizontal buses 296 and 297 by first removing connecting links 296" and 297", respectively, thereof, and then connecting or patching leads 321 and 322 of the judge's console circuitry, see FIG. 30, onto connections 296' and 104 of first switch 56 in horizontal bus 296, and connecting or patching leads 323 and 324 of the auxiliary circuit shown in FIG. 30 onto connections 297' and 104 of first switch 56 in horizontal bus 297. As indicated in FIG. 30, these circuits are now open to switch 82 on the judge's console 17, see also FIG. 6. Likewise, to set up two rows of switches 56 of each polling place apparatus 14 for the exclusive use of the Democrat Party ballot, the links 298" and 299" of horizontal buses 298 and 299 are first removed and leads 331 and 332 of the auxiliary circuit are patched or connected to connection 298' and the contact 104 of the first switch of horizontal bus 298, while leads 333 and 334 are patch connected to the contact 299' and contact 104 of the first switch 56 in the fourth bus, namely, horizontal bus 299, see FIG. 28, of the primary electrical circuit in each polling place apparatus. Thus, as indicated in FIG. 30, horizontal buses 298 and 299 form an open circuit to switch 83 on judge's console 17. Should an official ballot call for additional parties than those above mentioned, additional leads 341, 342, and 343, 344; as well as 351, 352 and 353, 354, are provided for making patching connections in the same manner as above described but to the next four succeeding horizontal buses in pairs including horizontal bus 300 shown in FIG. 28 and the following horizontal bus, not shown, together with the next two horizontal buses, also not shown. Before patching, of course, the link 300" is removed from horizontal bus 300.

With particular reference to FIG. 31 of the annexed drawings wherein we have illustrated in schematic plan view the electrical circuit preferably employed in the preferred embodiment of our invention for controlling the transport of the magnetic recording tape and the paper tape 27 for carrying the write-in votes or preferences. As shown, the circuit is supplied with 115 volt 60 cycle alternating current from a source thereof, not shown, through leads 316 and 317 and through primary conductors 316B and 317B upon the closing of master key lock switch 72 on the judge's console 17. Upon thereafter closing the vote-casting switch 67 contemporaneously with or shortly after the closing of judge's control switch 81, which is in series with the switch 67, the conductor 319 is energized to effect the energization of the latch coil 371 of relay 260 whenever stop contact brush 272S, hereinbefore termed the twenty-first brush, engages underlying contact plate 279' through a slot of the master recording tape 26; the circuit being traceable from the switches 81 and 67 over conductor 319 to contact plate 279', to brush 272S and over a lead 374 to normally closed contacts 375 of relay 260, thence over a conductor 376 to latch coil 371 and over a lead 377 to the other primary conductor 317B and returned through terminal block 317E to main conductor 317 leading from the source of 115 volts 60 cycle alternating current. The establishment of such portion of the circuitry of FIG. 31 causes relay to maintain contacts 375 in their shifted position and to close normally open contacts 380 which de-energizes coil 371, although it remains mechanically latched in closed position, and almost simultaneously de-energizes conductor 374 since the solid or unslotted portion of recording tape 26 prevents the stop brush 272S from brushing the underlying contact plate 279'. In the closed position of relay 260, i.e., with both contacts 375 and 380 thereof in their shifted position, the conductor 380' leading from contact 380 supplies potential to a selenium rectifier 362 which then supplies direct current voltage to the coil 255A of magnetic clutch 255, see FIG. 25, causing the transport motor 248 to drive shafts 243 and 243', see FIG. 24, and thereby causing the magnetic tapes 26 to be wound or moved as above described. The tapes 26 move until the succeeding aligned slots 187 in the tapes 26 permit brushing again of the underlying contact plate 279' by the stop brush 272S and, because relay 260 is closed, the re-set coil 372 of the relay will be energized through pickup brush 272S, and the relay contact 375 and a conductor 378 leading from closed contacts 375 of the relay to one side of re-set coil 372, the other side of such coil being connected to the other side of the circuit or to primary conductor 317B through leads 379 and 377, as shown. The energization of re-set coil 372 effects the unlatching of the mechanical latch on coil 371 and also simultaneously effects the de-energization of magnetic clutch coil 255A which, in turn, disengages clutch 255 from the shaft of tape transport motor 248 to remove the torque therefrom as well as from tape take-up spool 232, see FIG. 22. It should be noted that the instant action of the magnetic type clutch stops the tape at a position that slots 187 of tapes 26 are in alignment and stop contact brush 272S and underlying contact plate 279' are electrically connected. This accomplishment is also controllable by the length of the slots 187 in tape 26. It is of course understood, by a reference to FIG. 31, that tape transport motor 248 is constantly energized so long as polling place apparatus 14 is plugged into a source of 115 volt 60 cycle alternating current and master key lock switch 72 is closed.

In addition to the foregoing elements, the tape and paper transport circuit shown in FIG. 31 includes a plurality of switches 56 which when pulled out to their extreme positions closes the circuit to the paper transport relay 260', such write-in switches being designated by the reference numeral and character 56W in the showing of FIG. 31, and it being understood that the number of such switches 56W is indeterminate yet within the confines of the particular format of switches in the panels of the polling place apparatus. For brevity, only three write-in vote switches 56W are illustrated in the showing of FIG. 31, such three switches being connected in parallel and across the main conductors by means of an electrical lead 386 connecting main conductor 316, not shown, through primary conductor 316B to one contact of one switch 56W, together with a common bus 387 from which short leads 388, 389, 390 are employed to connect the lead 386 to one contact of each of the switches 56W comprising the series of switches which are moved to write-in vote positions; the other contacts of such switches being connected together by a line 391 and to one side of the relay 260' by a lead 392 and the conductor 368, the circuit through such switches 56W and the relay 260' being completed over conductor 369 from the other side of relay 260' to the other main conductor 317, not shown in this view, through primary conductor 317B and terminal block 317E, see FIG. 28. Thus, whenever a switch 56 is pulled out to its fully out or write-in vote position, or a number of such switches 56 on the polling place apparatus 14 are so pulled out, the positions of all such fully pulled out switches would be, insofar as the circuitry of FIG. 31 is concerned, the closing positions of one or more of the switches designated by the reference numeral and character 56W, and an auxiliary circuit is completed through relay 260' to energize the same, and, in turn, effect the transport of paper tape 27 by rotation of motor 248'. Of course, the contacts 393 of the paper transport relay 260' must be in closed position to effect the rotation of motor 248', as just described, since the righthand contact 393 is in the only line connecting the motor 248' with the line 316B over conductor 366; the circuitry containing motor 248' including lead 367 connecting the other side of the motor to primary conductor 317B.

A paper transport limit switch 396 is interposed in the circuit shown in FIG. 31 by means of a conductor 397 leading from main conductor 316, not shown in this view, through primary conductor 316B. When both switches 393 and 396 are closed to complete an auxiliary circuit from main conductors 316 and 317, not shown, through primary conductors 316B and 317B and through relay 260', upon closing of master key lock switch 72 and with the circuit plugged in to a source of 115 volt 60 cycle alternating current, paper tape transport is accomplished when any switch 56W is moved to a closed position; access to the paper tape for writing in a vote having been obtained by pulling door 68 open on the polling place apparatus 14. Upon opening all of the switches 56W that have been closed by activation of the re-set mechanism shown in FIGS. 8–12 inclusive, the paper transport limit switch 396 will be opened, and auxiliary circuit through relay 260' will be broken; the closing and opening of limit switch 396 being effected by means of prepunched slots 27', see FIG. 31A, in paper tape 27, which are properly spaced apart to control the length of tape 27 moved onto spool 266A or 266B over which paper tape 27 is wound, together with a limit switch actuating leaf 396', upon entering one of said slots 27' in the tape, as explained hereinafter. The limit switch 396 and actuating leaf therefor are conventional and readily available on the market as a combined micro switch and connected depending leaf for moving the switch from closed to open positions and vice versa.

In FIG. 31A of the annexed drawings, we have illustrated a housing 24' in which each cassette 24 may be installed for movable mounting of the paper tape 27 contained in such cassette. As shown, the tape 27 is trained over spools 266A and 266B which are carried, respectively, on spindles 266' and 267', see FIG. 33A; the spindle 266' conveniently being a driven spindle and placed in driving connection with paper tape transport motor 248' through conventional belt and pulley drive, as shown. As indicated, the relay 260' controlling the starting and stopping of motor 248' can conveniently be installed within housing 24'. It is to be noted that the housing 24' is formed with a passage 24" therein to permit the passing of the limit switch actuating leaf therethrough and to enter a slot 27' of the tape 27 as it is moved, thereby effecting actuation of the micro switch 396 to open poistion to momentarily break the circuit through relay 260' and stop tape movement. As the tape continues to be wound for a short distance after the limit switch 396 has been opened by reason of the dropping of the leaf of the switch through a slot 27' of the tape, the leaf will move out of the slot 27' and ride upon the solid or unslotted portion of the tape 27 and by so doing move the switch 396 again to a closed position thus to condition the auxiliary circuit containing relay 260' for energization again upon the closing of a switch 56W.

In accordance with our invention means are provided in our improved rapid preference system to permit each voter or user of the system to make any allowable number of selections out of any predetermined number of candidates by moving selected switches 56 to their voting positions; it being understood that if any voter selects or votes for one more candidate than the particular ballot permits he will be required to remove all his selections from the controlled area of the voting board or panel and to re-vote. These means are illustrated in schematic plan view in FIG. 32 of the annexed drawings and the elements included in the circuitry there depicted permits a control area of the panel of switches 56 on each polling place apparatus 14 to be patched onto the rear of the switch bodies 135. We aptly term these means the "X" out of "Y" device, and it is an auxiliary circuit to the primary electrical circuits contained in each polling place apparatus 14 and each judge's console 17 for setting up a controlled area in the format of switches. As shown in FIG. 32, we provide in this auxilary circuit a plug 401 having an electrical contact on each side thereof which are designated by the reference numerals 117' and 118', since when the device is patched into a switch body 135, the plug 401 is inserted into a spring connector 114, see FIGURES 7 and 28 having electrical contacts 117 and 118 which are engaged by the contacts 117' and 118' of plug 401. We also provide in the auxiliary circuit of FIG. 32, a second patch plug 402 which includes but one electrical contact, designated by the reference numeral 120" and being situated thereon along one side thereof; such patch plug 402 being insertable into spring connector 116 of another switch 56 of the switch circuit, FIGURES 7 and 28, to bring contact 120" of plug 402 into engagement with connector contact 120, and the patch circuitry being completed over short conductor 120' to the other spring connector contact 119 of such spring connector 116, all as is more particularly described below in connection with an assumed example of a ballot affording the voter the choice of designating but 3 out of 5 of the ballot candidates for a specific office. The contacts 117' and 118' of patching plug 401 are connected to the single contact 120" of patching plug 402 by means of electrical conductors 403 and 404 which are connected by short conductor 120' through relay 405, see dotted rectangular showing of FIG. 32, with its normally closed contacts 406.

For simplicity of explanation, and because of space limitations, we have illustrated the auxiliary patching circuit of FIG. 32 in connection with but one horizontal bus, say the bus 298, of the primary electrical circuit of each polling place apparatus 14; such horizontal bus 298 serving the series of movable switches 56 which have been designated by the reference numerals and characters as C1, C2, C3, C4 and C5 in FIGS. 28 and 33A of the annexed drawings. As indicated near the bottom of FIG. 32, and as is also apparent from the showing in FIG. 28, the potential is supplied to horizontal bus 298 through main conductors 316 and 317, not shown in FIG. 32, over primary conductors 316C and 317C joined to said main conductors, respectively. As shown, the primary conductor 316C is connected to vertical buses 306–310, inclusive, which are indicated collectively in FIG. 32 by the single reference numeral 306, and such vertical buses are connected to the series of terminals 113 on the rear of each switch body 135 of the polling place apparatus 14. The terminals 113 are, in turn, connected through electrical conductors 122 and 128, see also FIG. 7, to the switch contacts 96 and 102, respectively, of the two companion switches 56 in each switch body 135. The auxiliary circuit of FIG. 32 also includes a common bus 407 connecting all of the spade connectors 115A, which are joined to switch contacts 95 by means of leads 125, as well as connecting all of the spade connectors 120A, which are joined to switch contacts 101 by conductors 131, to the normally closed contacts 406' of relay 405. Moreover, the "X" out of "Y" patch circuit of FIG. 32 includes a common bus conductor 408 connecting all of the terminals 107, which are joined to switch contacts 95' by leads 125', as well as terminals 109, which are joined to switch contacts 101' by conductors 131', to one side of step-relay coil 409. The step relay is depicted in the form of a clock dial in FIG. 32 and designated therein by the reference numeral 409' with the steps of the dial delinated numerically from 1 to 21 and indicated by the solid contact dots arranged circumferentially about a center contact dot 411 which, in turn, is bounded by a contact ring 412. As a part of the relay 409', we provide a pair of rotatable blades 413 and 414 delineated in FIG. 32 in the form of hands of a clock, which are respectively connected to the center contact dot 411 and ring contact 412.

To complete the auxiliary circuit, it is to be observed that the relay coil 409 is connnected by means of a conductor 415 to one side of the charging coil 415' of relay 405 and is also connected to the primary conductor 317C by means of the lead 415" and, further, we provide conductors 411' and 412' to connect the contacts 411 and 412 of the step-relay 409', respectively, to conductor 407 and to one side of the charging coil 415' of relay 405, as well as provide means for preventing the overvoting for candidates including a judge's alarm 416 and a voter's alarm 417, which may take either the form of a visual indicator or a sound indicator; such alarms being connected in parallel across the charging coil 415' and the primary conductor 317C through conductors 418 and 419, respectively, as well as short leads 421 and 422 to opposite sides of alarm device 417. It is to be further noted that a re-set coil 423 has been interposed in the "X" out of "Y" auxiliary or patching circuit of FIG. 32 to return the clock hands or switch blades 413 and 414 to zero or their initial positions for use by succeeding voters, such re-set relay 423 being connected at its one side by a flexible line 424 to an arrowhead contact 425 which may be selectively connected to one of the solid contact dots of the step-relay 409', and being connected at its other side to the primary conductor 317C.

With the circuitry of FIG. 32 in mind, and assuming that a 3 out of 5 selection is permitted on the ballot with respect to the third row of switches which are designated in FIGS. 28 and 33A by the reference numerals and characters C1, C2, C3, C4 and C5, all associated with horizontal bus 298, see FIG. 28, and supplied with potential through vertical buses and terminal contacts 113, plug 401 of the patch auxiliary circuit of FIG. 32 is inserted in the rear of switch body 135 containing switch C1 and associated spring connector 114, while patch plug 402 is inserted in the spring connector 114 of the switch body cotnaining switch C5. Accordingly, the horizontal bus 298 is split by the insertion of plug 401 in switch body containing switch C1, but the bus is re-connected through the short conductor 120' through closed contacts 406 of relay 405, then through conductor 404 to contact 118' of patch plug 401 and through all contacts of the switches until spring connector 114 of the switch body 135 containing switch C5 is reached. Since patch plug 402 has been inserted at this point, as above stated, the remainder of horizontal bus 298 is energized. It may be observed at this point that we have thus put external control circuitry from the incoming source of tone energy over conductor 293 onto bus 298 from the point of spring connector 114 associated with switch C1 to a like position on the fifth switch C5 of the line. Further, it is to be noted that should relay 405 be energized the contacts 406 would be opened, and in such open position of contacts 406 we would have de-energized that portion of the horizontal bus 298 between control points of contact 117 of spring connector 114 associated with switch C1 and contact 118 of spring connector 114 associated with switch C5.

In order to accomplish the condition immediately above described, we employ the step-relay 409' to secure the desired pre-selected or ballot required "X" out of "Y" situation. It will be noted that as the selected switches 56 are pushed into their fully in or voting positions, bridge 88 passes the momentary contacts 95' or 101'; it being noted that the momentary controls are all connected to the common bus or conductor 408 through switch contacts 107 and 109 common to all switch bodies 135, see the lower part of FIG. 32. In so passing such momentary contacts an impulse of 115 volt 60 cycle alternating current reaches step coil 409 of step-relay 409' which causes rotatable switch blade 413 to advance one step. This occurs each time any one of the five controlled switches C1-C5, inclusive, are pushed to the voting position as indicated in FIG. 7B, through the momentary position illustrated in FIG. 7A. Since the desired or required condition is 3 out of 5, in our assumed situation, the rotatable switch blade 414 is placed on step contact 4 of the step-relay, as indicated by the clock dial 409'. This effects electrical continuity between point or contact 4 of step-relay 409' and the activating or charging coil 415' of the relay 405 to energize the same, thereby closing contacts 406' thereof and simultaneously opening the normally closed contacts 406 of relay 405 to break the circuit to horizontal bus 298. It is to be noted that when the contacts 406' are opened, the action is to span a contact connected to conductor 418 and the alarm devices 416 and 417 are energized. To turn off these alarms and to restore bus 298 to its initial condition, the voter must pull out all switches 56 in the controlled area to their neutral positions, and as each switch is so returned the bridge 88 thereof again passes through the momentary position of FIG. 7A which again impresses impulses of 115 volt 60 cycle alternating current on step coil 409. This action continues until rotatable switch blade 413 reaches contact dot 8 of step-relay 409', whereby the re-set coil 423 is energized by virtue of the connection of lead 424 between contact point 8 of step-relay 409' and the re-set coil 423; energization of re-set coil 423 effecting the return of the rotatable switch blade 413 by conventional means to its initial position for re-voting by a succeeding voter. It is to be understood that any desired "X" out of "Y" condition can be set into the polling place apparatus circuit by variably positioning the rotatable contact 414 on the relative position of lead 424.

It is to be further understood that the optional auxiliary circuit shown in FIG. 32 may be patched into the primary electrical circuit of each polling place apparatus 14 at any given area required by the format of the ballot. To change the allowable number for voting preferences, rotatable contact 414 is placed in contact with the numerical dot contacts of the clock dial representation of relay 409' which is one digit greater than the number permitted by the ballot. This causes the alarms 416 and 417 to sound, or become visible, when a voter over-votes in the controlled area, as above described. To re-set the step-relay to original condition, the conductor 424 is connected into step-relay 409' at the dot contact which is double that of the contact number represented by the location of the rotatable contact blade 414. In the showing of FIG. 32, the re-set portion of the circuit is set, by conductor 424, at step-relay contact number 8 which is twice 4 at which the rotatable contact 414 is set.

The schematic elevational view of FIG. 33 depicts graphically in one line diagram at the left the transport of the master recording tape 26 through a polling place apparatus 14 and the recording of recorded bits thereon by the brushing of the contact brushes 272 with the underlying tone plate 279 and the contacting of the recording heads 271 with different successive areas of the tape 26 during transport. As shown in the single line diagram at the left, and assuming the primary electrical circuit of a polling place apparatus plugged into a source of 115 volt 60 cycle alternating current with master key lock switch 72 closed and judge's control switch 81 closed, the depression by the voter of vote-casting switch 67 will transport tape 26 and by virtue of the energy supplied from tone plate or oscillator-amplifier 311 to tone plate 279, the tone will be transmitted over conductor 291 when the brushes 272 pass through slots in the tape 26 to brush underlying contact plate 279. Accordingly, the horizontal bus 296 is supplied with tone whereby upon closing of a switch 56 the recording head 271 will be energized through switch contacts 93, 94 and vertical bus 301, the tone circuit being completed by common bus 314 back to the oscillator-amplifier 311. The judge may depress a switch 83 to provide a partisan primary ballot, see also FIG. 30, or a switch to effect the closing of the contacts 406 of relay 405 of the patch circuit shown in FIG. 32 and the voter may pull out or open a door 68 for purposes of entering write-in votes, as by the switches 56W in FIG. 31 of the drawings; all of which elections or options of the voter not effecting the circuitry to the horizontal bus 296 of the primary electrical circuit of each polling place apparatus 14 when effecting the recordation of bits on the tapes 26; the closing of a switch 56 also bridging contacts 95 and 96 on the power side indicated by conductors 316 and 317.

The view of FIG. 33 also depicts at the right, in one line diagram, the action at vote tabulating headquarters where the master recording tape 26 is transported in a direction opposite to the direction of transport through a polling place apparatus 14, so that pick up brushes and pick up heads, hereinafter more particularly explained, pick up the recorded bits from the tapes 26 for amplification by amplifiers, designated generally by the reference numeral 431 in FIG. 33, for reception in a digital counter, designated generally by the reference numeral 432. The counter 432 is electrically connected into the tabulator primary circuit by means of suitable conductors, designated collectively by the reference numeral 433, leading from the pick up brushes; such tabulator circuit including leads from the amplifiers 431 to the digital counter 432 which are collectively designated by the reference numeral 434, and also leads collectively designated by the reference numeral 436 from the pick up heads to the amplifiers 431 and leads collectively designated by the reference numeral 437 from the amplifiers 431 to the tone plate, hereinafter described, to complete the tabulator circuit.

The showing of FIG. 33A has been heretofore generally described, the block diagrams at the far left indicating the judge's console 17 and the oscillator-amplifier 311 of the primary electrical circuit, see FIG. 28, of the polling place apparatus 14. This view also shows the transport of the two master recording tapes 26 through the polling place apparatus as well as the transport therethrough of the paper tapes 27. FIG. 33B depicts graphically the tabulator 31 with its front panel fashioned with a plurality of openings arranged in pairs by rows and columns through which the numerals are visible adjacent a candidate's name or adjacent the number of a proposition voted upon; the upper row of windows of each pair of windows in each row thereof being designated generally by the reference numeral 438 and visually displaying the cumulative totals 438' at any given moment of the count, see FIG. 35A, and the lower row of windows of each pair of windows in each row thereof being designated generally by the reference numeral 439 see FIG. 35A, and visually displaying as sub-totals 439' for the candidate and propositions the number of vote cast therefor at a given precinct the tape for which has just been run through the tabulator 31.

In accordance with our invention, we provide an auxiliary patch circuit for enabling a voter to vote for a candidate of his own choice, notwithstanding the fact that the ballot carries only certain specified candidates for a particular office. The paper tape 27 for writing in the candidate of the voter's own choice, together with the transport therefor have already been described. We now explain the circuit for effecting the aforesaid object and which is shown in schematic plan view in FIG. 34 of the annexed drawings. It is to be understood of course, that the circuit of FIG. 34 can be patched into the primary electrical circuit of a polling place apparatus 14 at any desired area of the format of switches 56. The showing of FIG. 34 should be considered in connection with the views of FIGS. 4, 5, 7 and 28. As shown in FIGS. 4, 5 and 28, a door 68 or 68' can be opened and the voter can write-in the name of the candidate of his choice on paper tape 27 which is intermittently moved in the same way as the master recording tapes 26. Assuming that there are three potential candidates for an office, which are represented separately by the switches C1, C2, and C3, see FIG. 34, and that a voter likes none of such candidates but desires to write in a candidate of his own choice on tape 27. Accordingly, we provide means for locking out the ballot candidates so that they cannot be voted upon and provide means enabling the writing in of a candidate's name on paper tape 27. To this end, the circuit of FIG. 34 includes the conductor or tone feeder 293 which energizes horizontal bus 298, which energizes contacts 117 of the spring connector 114 of such horizontal bus 298 which is associated with switch C1. A patch plug 441 of the write-in lockout circuit of FIG. 34 connected across leads 316D and 317D is inserted into spring connector 114 on bus 298 to bring the contacts 442 and 443 of patch plug 441 into engagement with the contacts 117 and 118 of the spring connector 114 associated with switch C1 to provide an electrical connection between such lock-out auxiliary circuit and the tone portion of the primary circuit shown in FIG. 28. To confine the control action of such lock-out circuit to the three switches C1 through C3, the patch plug 44 of the lock-out circuit, which is connected to plug 441 by lead 445, is inserted into the spring connector 116 associated with switch C4, and to cause engagement of the contact 120 of such spring connector with the contact 446 of plug 444. It will be observed, however, that since a solid electrical connection has been established between the contact connection of spring connector 114 associated with switch C1 and the contacts of spring connector 116 associated with switch C4 of bus 298, the balance of bus 298 is energized and ready for a voter's selections. By opening a door 68 and thus making a portion of paper tape 27 available to writing in a name of the voter's own choice as a candidate for any office, the circuit to the patch plugs 441 and 444 is broken and the portion of bus 298 from contact 118 of switch C1 to contact 119 of switch C4 is isolated or de-energized, thus preventing the possibility of a voter writing in a name and at the same time selecting a candidate on the board of the polling place apparatus 14, and voting for both. As indicated at the lower portion of the schematic plan view, the patch plugs 441 and 444 may be inserted in switch connectors associated with switch D3 in horizontal bus 299 of the primary circuit of the polling place apparatus so as to isolate such switch when a door 68 is opened to break the circuit through patch plugs 441 and 444. In short, the auxiliary circuit of FIG. 34 can be patched into any portion of the format of switches on the front panel or board of each polling place apparatus 14 as desired.

The enlarged showing of the front panel of the tabulator 31 in FIG. 35 is to indicate more clearly the double rows of windows 438 and 439 in which the counter numerals 438' and 439', respectively, appear during tabulation, see FIG. 35A; the sub-totals appearing in the lower windows of each double row thereof. We have shown in FIG. 35 the cable 43 which carries the plurality of conductors establishing electrical connections between the electrical circuit of the tabulator 31 and the operator's console 42, and we have also shown on cable 43 a multi-socket or female plug 452 for receiving the prongs of a complementary plug 462 on cable 43 extending from console 42. However, as hereafter explained, the plug 462 may be connected to a multi-socket plug, not shown, of an electrical circuit of a data processing device, not shown, or of a printing mechanism, also not shown, into which device or mechanism the preferences cast by voters and recorded in the form of bits may be fed from the operator's console 42 by play-back of the master recording tapes 26, rather than being fed to the digital counters of the tabulator 31, as shown. Or, the socket plug 452 may serve to receive a prong plug, not shown, connected into a telephone transmission line over which the designated preferences in the form of bits on tapes 26 may be transmitted to the tabulator 31 for translation to the digital counters thereof by play-back of the tapes 26 over the circuitry of FIG. 28, and connector plug for connection to the input side of the telephone transmission lines, by transport in the polling place apparatus 14 rather than in the official's console 42.

An enlarged perspective view of an official's console 42, used by a counting judge voting official 34 at central headquarters, is illustrated in FIG. 36 of the annexed drawings, such console housing a control electrical circuit, not shown in this view, which is electrically connected by conductors encased in cable 43, see FIG. 3, to the conductors of a primary electrical circuit of the tabulator, also not shown in this view. Suitable indicator lamps 453, 454, and 455 may be removably mounted in sockets formed in a back panel 456 of the console 42 to apprise the official of the status of certain circuits, and the console 42 also is provided with a series of manually operable switches 457, 458, 459, 460 and 461 to be selectively actuated at the discretion of the election official 34. While the conductors encased in cable 43 may be directly connected to the circuitry of the tabulator 31, it is within the purview of the present invention to connect the circuits of console 42, by means of the prong plug 462, to the circuitry of an electrically operable printer, not shown, whereby the play-back of the master recording tapes 26 will cause a recordation of the votes rather than a visual display thereof on the board or front panel of the tabulator 31. The desk 42 also is provided with two sets of cassette-receiving pins, one pin of one set being a driven pin to effect rotation of the spools 231 of each cassette on which the master recording tape 26 has been wound during transport of such tape in the polling place apparatus 14. The set of pins at the left side of the operator's console 42 have been designated by the reference numerals 463 and 464 and such pins may be rigidly or immovably mounted in the console; such pins 463 and 464 serving only as temporary supports for each cassette 23 brought to the operator's console 42. The set of pins at the operator's right in desk 42 have been designated by the reference numerals 466 and 467, the former conveniently being a driven pin and receiving spool 232 of each cassette 23, and the latter an idler pin which is mounted for rotation and which receives spool 231 of each cassette. Within the operator's console 42 are mounted the requisite components and electrical circuits to effect not only the rotation of pin 466 in a direction to unwind the tape from spool 231 and to wind the same spool 232, but also to effect the picking up of the bits theretofore recorded on to the tapes. Such recapture of the bits, or picking up thereof from each tape 26 is accomplished by pickup brushes and pickup heads, not depicted in FIG. 36 but shown schematically in FIG. 33B, and thereafter transferred by impulse to the digital counters of the tabulator 31.

While any suitable electro-mechanical means may be employed to unwind the master recording tapes 26 at the official's desk 42, we preferably utilize the circuit and components shown in schematic plan view in FIG. 37 of the accompanying drawings. As illustrated, a pair of primary electrical conductors 468 and 469 are provided for supplying 115 volt, 60 cycle alternating current from a source, not shown, to a tape transport motor 471 over a conductor 472 leading from primary conductor 468 to one side of the motor, and thence from the other side of the motor 471 over conductor 473 through normally open relay contact 474 and over electrical conductor 476 to the other primary conductor 469. A relay 478 to maintain the tape transport motor 471 in operation, is connected across the primary conductors 468 and 469 by means of a conductor 479 leading from primary conductor 468 to one side of the relay, and a short lead 480 connecting the other side of the relay through its contacts 474 and a conductor 481 leading from the switch 474 through a normally closed switch 482 to the other primary conductor 469 of this circuit. The lamp 453 on official's console 42 is connected in parallel with relay 478 to indicate that the tape transport motor 471 is operating, and connects into this circuit through normally open switch 459 on console 42 which, when momentarily closed, will light the lamp 453 and will close contacts 474 to start motor 471 which will operate until tape 26 is completely wound, which causes limit switch 482 to open and thereby cause relay 474 to return to "off" position stopping motor 471 and turning out indicator light 453.

The internal circuitry contained in the tabulating official's console 42 also includes an electrical conductor 486 which connects at its one end to the electrical circuit, not shown, in the electrically operable camera 46, and connects at its other end to primary conductor 468, together with a second conductor 487 which connects at its one end to the electrical circuit, not shown, of camera 46 and which connects to the other primary conductor 469 through a normally open switch 460 on the tabulating official's console 42 which switch, when momentarily closed, causes the energization of lamp 454 on console 42 to apprise the official 34 that the camera circuit is energized; the two conductors 486 and 487 leading to the camera being conveniently sheathed in cable 44, see FIG. 3, and the lamp 454 being connected in parallel to the camera circuit by short leads 489 and 490. The operation of the camera 46 can be automatic by virtue of relay 478 in conjunction with tape limit switch 482 and off-on switch 457. So long as tape 26 is being transported within cassette 23, in the reverse or opposite direction from its direction of transport when in the polling place apparatus 14, limit switch 482 will be held in the closed position shown in FIG. 37. When tape 26 is completely rewound, switch 482 returns to its normally open position, thereby connecting the switch blade of switch 482 with contact 482'. Since relay 478 is de-energized by such action, contacts 474 return to normal positions, as shown, completing circuit continuity from lead 487' through contacts 474, through conductor 481 and through switch 482 and thence over conductor 494 to the switch 457 installed on official's console 42 to complete the circuit to camera 46 and to indicator light 454. It is to be understood that as long as the manual-automatic switch 457 is in the closed position, the camera 46 is automatically energized each time the tape 26 is completely re-wound in each cassette 23.

In addition to the foregoing components, the circuitry in tabulating official's console 42 includes the relay 491' with relay contacts 458' for energizing conductors 496 and 497 which connect to the reset coils of the impulse counter bank of lower counters contained in the tabulator and which effect the re-setting of such lower sets of counters to zero after the completion of the tabulation of the recordings on the one or more master recording tapes 26 for each precinct, or after such accumulative and sub-totals have been photographed by camera 46. To this end, one side of the re-set coils 491 (see FIGURE 38) of the lower counter bank are connected by conductor 496 to the primary conductor 468 of this circuit, while the other side of each of the reset coils 491 is connected over conductor 497 to the other primary conductor 469 through a normally open switch 461 on the tabulating operator's console 42. Momentary depression and closing of switch 461 will energize the lamp 455 on console 42, the lamp 455 being connected in parallel with the lower counter register circuit by leads 499 and 500, see FIG. 37. The closing switch 458 by the tabulating official 34 energizes the automatic re-setting circuitry hereinafter described. When switch 458 is in the closed position, and after tape 26 has been completely rewound as hereinafter described, tape limit switch 482 returns to its normal or initial position in contact with companion contact 482' completing continuity of the circuit through conductors 494 and 493, thereby effecting energization of relay coil 491' and closing contacts 458', which are connected across the main lines 468 and 469 by short leads 458A and 458B, all impulse counter reset coils 491, see FIG. 38, and lead 496.

The schematic plan view of FIG. 37 illustrates the pickup heads, designated generally by the reference numerals 501, 502, 503, 504 and 505, as well as the pickup brushes, designated generally by the reference numerals 506, 507, 508, 509 and 510, which are arranged in succession adjacent to the top of the tabulating official's console 42, but not shown in the views of FIGS. 3 and 36, for picking up the recorded bits on each master recording tape 26 as it is played-back at such tabulating officials's console 42. It is to be understood that while there are twenty pickup heads and twenty pickup brushes for recovering the recorded bits from the reverse running of the master recording tapes, for the sake of brevity and clarity of illustration, but five pickup heads bearing numerals 501–505 and five pickup brushes 506–510 are shown in the views of FIG. 37 and FIG. 38 in connection with the circuitry of console 42 and that of the impulse counters contained in tabulator 31. Instead of a recording tone generator, used in the polling place apparatus 14 and designated by the reference numeral 311, see FIG. 28A, we employ in the circuitry for the playback of the master recording tapes 26 a conventional scanning plate 511, see FIGS. 37 and 38. An electrical conductor 514 connects the scanning plate 511 through a common bus to amplifiers, as hereinafter explained. Each of the pickup heads 501 to 505 are connected to the aforesaid amplifiers, by means of dual electrical leads, designated 516, 517, 518, 519 and 520, respectively, see FIGS. 37 and 38, and each of the pickup brushes 506–510 are connected by means of conductors 521, 522, 523, 524, and 525, respectively, to horizontal buses of the impulse counter circuit of the tabulator 31, see FIG. 38. It is to be noted that the various conductors of the circuitry installed in the tabulating official's console 42 for operating the impulse counters contained in the tabulator 31 are conveniently sheathed in an insulated cable 43 leading from console 42 to tabulator 31, see FIG. 3 of the annexed drawings.

With particular reference to the schematic plan view of FIG. 38, it will be observed that the pickup heads 501–505 are shown in spaced or staggered relationship to one another in a descending diagonal series. This showing of the pickup heads is only for purposes of explanation in relation to an unwinding master recording tape since we preferably arrange these pickup heads in a linear relationship perpendicular to the line of travel of the tapes, much the same manner as the pickup brushes 506–510 are shown in FIG. 38, although the arrangement of the pickup heads and pickup brushes is not critical as long as they are arranged for engaging the moving unwinding tape and the underlying contact signal plate 511 so as to transfer the recorded bits to the impulse counters of the tabulator 31. Further, the showing of the impulse counters and amplifiers in FIG. 38 have been reduced for the sake of brevity and clarity to sets of five, it being understood that the number of counters and amplifiers are commensurate with the format of any given ballot and are, therefore, indeterminate. As shown, the dual leads 516–520 from the pickup heads 501–505 are connected to one side of amplifiers 526, 527, 528, 529, and 530, respectively, such amplifiers being connected into the primary circuit of the tabulator operator's console 42 comprising main conductors 469 and 468 by means of common leads 531, and 532, respectively, through short conductors 533, 534; 536, 537; 538, 539; 541, 542; and 543, 544 respectively. One output contact of each of the amplifiers 526–530 is connected, as shown, to a common bus 514 which is connected to scanning plate 511. The other output contact of each of the amplifiers 526–530 is connected by a series of vertical buses 546, 547, 548, 549, and 550 to each of a pair of upper and lower counters 551 and 552, respectively, arranged in rows and connected in parallel, as shown, and designated for convenience of explanation, as shown, and in relation to the horizontal buses 521–525 inclusive, by the reference numerals and characters, UC1–UC5 and LC1–LC5 with respect to the five upper and lower impulse counters of each of the rows and connected across buses 521–525 and amplifiers 526–530. Associated with each of the lower impulse counters LC1–LC5 on each horizontal bus 521–525 is a re-set coil 491; all of said re-set relays 491 being connected in parallel and across the lines 496 and 497 through manually operable switch 458' on the tabulator official's console 42; energization of such relays 491 automatically resetting all of the lower counters LC1–LC5 in all rows to zero, this being done after sub-totals registered by such lower impulse counters LC1–LC5 have been photographed by camera 46.

The activities at central counting or tabulating headquarters, as depicted in FIG. 3 of the annexed drawings, commence upon the receipt of the cassette or cassettes 23 from the first precinct transmitting the cassette to headquarters, it being assumed that the matter recording tapes 26 are to be moved in a reverse direction, or unwound from their spool 231, at central headquarters at official's console 42 rather than played back or moved in a reverse direction in each polling place apparatus 14, as hereinabove suggested, and transmitted over telephone transmission lines. Probably the first thing to be done is to connect the circuit of the official's console 42 as well as the circuitry of the tabulator 31 to a source of 115 volt, 60 cycle alternating current by closing master switch 555, see FIG. 38. After the cassettes 23 have been checked in at the desk 38 by officials 32 and 33 and the cassettes delivered to official 34 at console 42, each cassette 23 is successively placed upon the pins 466 and 467 to effect through the circuitry just described the digit by digit movement of both the upper counters 551 and lower counters 552 of the tabulator 31, see FIG. 38, which the numerals 438' and 439 of such upper and lower counters 551 and 552, respectively, appearing in the windows 438 and 439, respectively, of the "tote-board" or front panel of the tabulator 31, see FIG. 35A. As shown in FIGS. 35 and 35A of the accompanying drawings, the front panel of the tabulator is provided with channels 556 between the rows of double windows 438 and 439, from top to bottom thereof, for the reception of strips 556' bearing the names of the candidates and indicia concerning the propositions voted upon, to conform with the strips appearing in the channels 59 of each polling place apparatus 14 so that the votes cast for each candidate and each proposition in each polling place will be registered on the impulse counters 551 and 552 of the tabulator 31 in ballot format relative positions on the front panel thereof.

After each cassette 23 for voting precinct has been processed through the tabulator 31 with the total votes of such precinct for the candidates and propositions on the ballot appearing in upper counter 551 as part of a cumulative total 438 as well as in lower counter 552 as a sub-total 439, the tabulation official 34 closes the circuit to camera 46 so that a photograph of such precincts total votes, appearing as sub-totals 439 in the lower counter 552, can be made for display at the particular precinct as required under the provisions of most governmental election laws or by the articles or by laws of political or labor organizations. This procedure is followed repeatedly for each cassette 23 for each precinct until all of the cassettes 23 have been processed. The sub-total counters are re-set to zero, as above stated, after camera 46 has processed its picture thereof. The processed cassettes 23 are continuously loaded into carts 41 and taken to storage. In the meantime, a television crew may be continuously scanning the "tote board" of tabulator 31 with television camera 48 for telecasting the results of the election to television receiving sets, like the set 52 see FIG. 3. Also, in the meantime cassettes 24 bearing the paper tapes 27 are being checked in at receiving desk 38 and transferred to official's desk 40 where the paper tapes 27 are removed and unwound, and official 36, together with necessary aides, tally the write-in votes on recapitulation sheets for compilation and adding to the votes totaled in tabulator 31. It is our estimate that the entire tabulating process should be completed within approximately two to two and one-half hours after closing of the polls. Thus the radio, television and newspaper services can transmit election totals in an appreciably shorter time than has ever heretofore been accomplished. When all cassettes 23 have been processed, a final photograph is taken to afford an official count record.

In FIG. 39 of the annexed drawings, we have illustrated in schematic plan view a typical vacuum tube amplifier circuit, which can be employed, if desired, for actuation of the impulse counters 551 and 552. As shown, a pair of main conductors 561 and 562 supply electrical energy to the circuit from a source of 115 volt alternating current of thirty watt magnitude, the energy or potential being transmitted to the primary coil 563 of a step-up transformer 564 having split secondary coils 566, 567, 568 for energizing the filaments as well as the plates of a series of vacuum tubes 571, 572, 573, 574 and 575 and 526A. The output energy to the grids of tubes 572–574 is supplied from the pickup heads 501–505 etc., of which but one pickup head 501 is shown in FIG. 39 for brevity. The output of the vacuum tubes 572–574 is amplified by means of amplifiers of which but one, designated by the reference numeral and character 526A is shown in FIG. 39 with amplifiers output being transmitted to the impulse counters 551 and 552, not shown in the view, through the primary 576 and secondary 578 of an impedance matching transformer 577, as well as conductor 514 and the line 546.

The circuit of FIG. 39 is particularly devised for application to the impulse counter circuits of the tabulator 31 and this is believed to be the first time in the voting machine art that such vacuum tube-amplifier circuit has been combined with an impulse counter circuit.

In FIG. 40 we have shown a transistorized circuit which may be employed in lieu of the circuit hereinabove described for actuation of the impulse counters 551 and 552 of the tabulator 31, the circuit being powered from a 9-volt battery source 585, not shown, from main conductors 531 and 532, see FIG. 38. The signal input to the transistorized circuit can be to contacts 586 and 587 from any single pair of the dual leads 516–520 which are connected to the pick-up heads 501–505 inclusive. The circuitry of FIG. 40 includes transistors 591, 592, 593, 594, 601 and 602, the former transistors 591–594 which are connected in series and to a step-up transformer 596 through the primary 597 thereof in the conventional manner, with the latter two transistors connected to the transformer 596 in series with the secondary 598 thereof. The output of the transistors 601 and 602 is connected across an impedance coil 603 which matches the impedance of the impulse counter circuit and can be connected to such impulse circuit of the tabulator 31 through the vertical bus 546, see FIG. 38, connected to the pick-up head 501, as well as lead 514 which connects to scanning plate 511.

A modified embodiment of our invention insofar as recordation of voting preferences is concerned is illustrated in FIGS. 29, 29A and 29B. This modification comprises a specially formed magnetic tape, which is generally designated by the reference numeral 26A. In preparing our modified magnetic tape we utilize a ¼ inch magnetic tape which is currrently available on the market and pre-punch the same throughout its length with a plurality of slots, designated by the reference characters 184A', 184B', 184C', 184D' and 184E', and arranged in spaced relationship linearly along the transverse medial line of the tape, see FIG. 14E. As shown in FIG. 29, the tape 26A is coated on at least one surface with a magnetic or electrically responsive substance, such as iron oxide, and the aforesaid slots are fashioned in the ribbon tape linearly and substantially coextensive with the length of the tape and approximately at the transverse center of the tape. In the modification of FIG. 29, we provide a rotatable drum, which is designated generally by the reference numeral 610 and which is secured on a shaft 611 for rotation therewith when the shaft is coupled to a shaft, not shown, or other means for rotating the same. Preferably, the drum is fabricated from a suitable plastic material which sets to a relatively hard mass, as indicated by the reference numeral 612, and the drum is so formed as to provide a relatively wide periphery which is under-cut for the reception of lugs 613A depending from a plurality of segments 613 which are thus keyed around the periphery of the drum as shown particularly in FIG. 29B. We specially construct the thus formed segmental periphery of the drum so that an area 615 of each segment 613 is fabricated of electrically insulation material and a narrow strip area of each of the segments 613 is fabricated of electrically conductive material; such electrically conductive strip area on each segment constituting a tone or contact plate and being designated by the reference numeral 279 since they perform the same function as the tone plate 279 illustrated in FIG. 28. It is to be noted that the tone plate strip area 279 of each segment 613 is in a different location in relation to the width of the segment. In the view of FIG. 29B, the electrically conductive area 279 is adjacent the left of the segment, while the succeeding segment 613 counter clockwise, has been so fabricated as to provide the electrically conductive strip area 279 to the right of the strip area in the preceeding segment 613; such different positions of the areas 279 being for the purposes hereinafter specified. The segments 613 on the periphery of the drum 610 also are separated from one another circumferentially by means of transverse insulation strips 614.

In accordance with our present invention, the means, not shown, for rotating the drum 610 are employed to transport the tape 26A in a linear direction and in synchronism with the rotation of the drum, and we provide means supplying electrical energy to as well as for brushing the tone areas 279 of the segments with contact brushes 272A so as to impress a tone on the circuit for effective operation of recording heads 271A', 271B', 271C', 271D', 271E', such brushes 272A and recording heads 271'–271E' being in all respects similar to the brushes 272 and recording heads 271 described in connection with the circuitry of FIG. 28. To this end, the tone generator or oscillator-amplifier 311 is connected by means of a lead 314A and contact brush 311A directly to the extreme right side of each segment 613, which is fabricated of electrically conductive material, and electrical energy from an oscillator-amplifier 311 connected to a 115 volt, 60 cycle alternating current source by means of electrical conductors 312A and 313A. The balance of the circuitry associated with rotatable drum 610 is the same as that shown in FIG. 28, in that the contact brushes 272A are connected to the horizontal buses 296–300, see FIG. 28, by means of the conductors 291–295, respectively, see FIG. 29, while one side of each of the recording heads 271A'–271E' is connected by suitable leads to the vertical buses 301–305, inclusive, and the other side of each of the recording heads 271A'–271E' is connected by suitable electrical conductors and a common bus 314A to the other side of the oscillator-amplifier 311. The operation of the components of the circuitry of FIGS. 29, 29A and 29B is similar to the operation of the circuitry shown in FIG. 28 to impress bits on the so modified tape 26A all responsive to selected preferences designated by a voter in pushing into voting positions the various switches 56 of the polling place apparatus 14.

It is to be understood that the appended claims are to be accorded a range of equivalents commensurate in scope with the advances made over the prior art.

We claim:

1. A polling place apparatus for electromagnetically recording voter's preferences as they are made from an election ballot displayed on said apparatus, a primary electrical circuit, a plurality of manually operable preference designating switches movably mounted on said apparatus and electrically connected into said primary electrical circuit, said preference designating switches being adapted to be moved to a preference designating position into a non-preference designating position and into a locked position, a master recording tape movably mounted in said apparatus, said master recording tape comprising a strip having a plurality of slots in a plurality of successive areas thereof, and a magnetizable coating on said strip in sections thereof adjacent to each of said plurality of areas containing said plurality of slots, and means associated with said primary electrical circuit for transporting said tape in one direction and for simultaneously recording bits thereon in successive ones of said plurality of areas which correspond to the designations made by each successive voter of his ballot preferences by movement of at least one of said switches to a preference designating position.

2. In polling place apparatus for electromagnetically recording voter's preferences as they are made on an election ballot displayed on said apparatus, a primary electrical circuit, a plurality of manually operable preference designating switches movably mounted on said apparatus and electrically connected into said primary electrical circuit, said preference designating switches being adapted to be moved to a preference designating position into a non-preference designating position and into a locked position, a cassette removably mounted in said apparatus, a cover on said cassette, said cover being adapted to be moved from a closed to an open position and vice versa, means for securing said cover against movement to provide a locked cassette, a master recording magnetizable tape movably mounted within said locked cassette, and means associated with said primary electrical circuit for transporting said tape during the recordation of each successive voter and means in said primary electrical circuit for transporting said tape in one direction and for simultaneously recording bits thereon in successive areas thereof which correspond to the designations made by each successive voter of his ballot preferences by movement of at least one of said switches to a preference designating position whereby said preferences are maintained confidential within said locked cassette for playback of said tape and totalization of the votes cast for each candidate and with respect to each proposition on the ballot.

3. A polling place apparatus for electromagnetically recording voter's preferences as they are made from an election ballot displayed on said apparatus, a primary electrical circuit, a plurality of manually operable preference designating switches movably mounted on said apparatus and electrically connected into said primary electrical circuit, said preference designating switches being adapted to be moved to a preference designating position into a non-preference designating position and into a locked position, a master recording tape comprising a strip having a plurality of slots in a plurality of successive areas thereof, and a magnetizable coating on said strip in sections thereof adjacent to each of said plurality of areas containing said plurality of slots, and means associated with said primary electrical circuit for transporting said tape in one direction and for simultaneously recording bits thereon in successive ones of said plurality of areas which correspond to the designations made by each successive voter of his ballot preferences by movement of at least one of said switches to a preference designating position, said plurality slots operatively connected in said primary circuit to close portions of said circuit to energize said recording means.

4. A polling place apparatus for electromagnetically recording voter's preferences as they are made from an election ballot displayed on said apparatus, a primary electrical circuit, a rectangular array of manually operable preference designating switches movably mounted on said apparatus and electrically connected into said primary electrical circuit each of said switches associated with one voter's preference said preference designating switches being adapted to be moved to a preference designating position into a non-preference designating position and into a locked position, a master recording tape movably mounted in said apparatus, said master recording tape comprising a strip having a plurality of slots in a plurality of successive areas thereof, and a magnetizable coating on said strip in sections thereof adjacent to each of said plurality of areas containing said plurality of slots, and means associated with said primary electrical circuit for transporting said tape in one direction and for simultaneously recording bits thereon in successive ones of said plurality of areas which correspond to the designations made by each successive voter of his ballot preferences by movement of at least one of said switches to a preference designating position, said plurality of slots operatively connected in said primary circuit to close portion of said circuit to energize said recording means.

5. In polling place apparatus for electromagnetically recording voters' preferences as they are made from an election ballot displayed on said apparatus, a primary electrical circuit, a plurality of manually operable preference designating switches movably mounted on said apparatus and electrically connected into said primary electrical circuit; said preference designating switches being adapted to be moved to a preference designating position into a non-preference designating position and to a locked position, a master recording tape movably mounted in said apparatus, means associated with said primary electrical circuit for transporting said tape in one direction and for simultaneously recording bits thereon in successive areas thereof which correspond to the designations made by each successive voter of his ballot preferences by movement of at least one of said switches to a preference designating position, a paper tape movably mounted in said apparatus for receiving indicia representing the candidate of the voter's own choice, and movable means for gaining access to said paper tape; actuation of said last named movable means rendering inoperative the means for recording bits on the master recording tape.

References Cited by the Examiner
UNITED STATES PATENTS

| | | | |
|---|---|---|---|
| 566,439 | 8/1896 | Aranson | 235—50 |
| 1,080,444 | 12/1913 | Henning | 235—50 |
| 1,474,414 | 11/1923 | Elliott | 235—54 |
| 2,054,103 | 9/1936 | Shoup et al. | 235—55 |
| 2,090,094 | 4/1937 | Ashley | 235—51 |
| 2,130,338 | 9/1938 | Campbell | 235—50 |
| 2,195,848 | 4/1940 | Carroll | 235—50 |
| 2,251,254 | 7/1941 | Shoup | 235—55 |
| 2,310,544 | 2/1943 | Randolph | 235—56 |
| 2,333,463 | 11/1943 | Bryce. | |
| 2,471,774 | 5/1949 | Powell | 235—50 |
| 2,484,552 | 10/1949 | Camras | 274—41.4 |
| 2,532,917 | 12/1950 | Howell | 274—41.4 |
| 2,550,950 | 5/1951 | Young | 235—51 |
| 2,581,765 | 1/1952 | Mann et al. | 274—41.4 |
| 2,594,893 | 4/1952 | Faus | 274—41.4 |
| 2,678,382 | 5/1954 | Horn et al. | 235—52 X |
| 2,983,440 | 5/1961 | Wales | 235—60.4 |
| 3,018,040 | 1/1962 | Wales | 235—60.4 |
| 3,024,974 | 3/1962 | Hocker | 235—51 |
| 3,108,743 | 10/1963 | Naugle | 235—54 |

LEO SMILOW, *Primary Examiner.*

LEYLAND MARTIN, *Examiner.*